(12) United States Patent
Geng et al.

(10) Patent No.: US 11,531,187 B2
(45) Date of Patent: Dec. 20, 2022

(54) OPTICAL IMAGING LENS ASSEMBLY

(71) Applicant: ZHEJIANG SUNNY OPTICAL CO., LTD., Zhejiang Province (CN)

(72) Inventors: Xiaoting Geng, Zhejiang Province (CN); Xinquan Wang, Zhejiang Province (CN); Fujian Dai, Zhejiang Province (CN); Liefeng Zhao, Zhejiang Province (CN)

(73) Assignee: ZHEJIANG SUNNY OPTICAL CO., LTD., Zhejiang Province (CN)

( * ) Notice: Subject to any disclaimer, the term of this patent is extended or adjusted under 35 U.S.C. 154(b) by 331 days.

(21) Appl. No.: 16/854,273

(22) Filed: Apr. 21, 2020

(65) Prior Publication Data

US 2020/0379219 A1 Dec. 3, 2020

(30) Foreign Application Priority Data

May 27, 2019 (CN) .......................... 201910444642.3

(51) Int. Cl.
*G02B 9/64* (2006.01)
*G02B 13/00* (2006.01)
(52) U.S. Cl.
CPC ........... *G02B 9/64* (2013.01); *G02B 13/0045* (2013.01)
(58) Field of Classification Search
CPC .............................. G02B 9/64; G02B 13/0045
USPC ......................................................... 359/755
See application file for complete search history.

(56) References Cited

U.S. PATENT DOCUMENTS

| 10,996,444 | B2 | 5/2021 | Yang et al. | |
| 2106/0291296 | | 10/2016 | Okada et al. | |
| 2016/0341938 | A1 | 11/2016 | Sun | |
| 2019/0154974 | A1* | 5/2019 | Chen | G02B 9/64 |
| 2019/0324232 | A1 | 10/2019 | Yang et al. | |
| 2022/0159156 | A1* | 5/2022 | Zhang | G02B 7/021 |

FOREIGN PATENT DOCUMENTS

| KR | 20120076210 A | 7/2012 | | |
| TW | I650592 B | 2/2019 | | |
| WO | WO2021022524 A | * 2/2021 | ............. | G02B 13/06 |

OTHER PUBLICATIONS

First Examination Report dated Jan. 24, 2022, in connection with India Patent Application No. 202044019372.

* cited by examiner

*Primary Examiner* — George G. King
(74) *Attorney, Agent, or Firm* — Norris McLaughlin, P.A.

(57) ABSTRACT

The present disclosure provides an optical imaging lens assembly, the optical imaging lens assembly sequentially includes, along an optical axis from an object side to an image side: a first lens having a refractive power, where an object-side surface thereof is a concave surface and an image-side surface thereof is a convex surface; a second lens having a refractive power; a third lens having a positive refractive power; a fourth lens having a negative refractive power; a fifth lens having a positive refractive power; a sixth lens having a refractive power, where an object-side surface thereof is a convex surface and an image-side surface thereof is a concave surface; and a seventh lens having a negative refractive power.

19 Claims, 18 Drawing Sheets

OPTICAL IMAGING LENS ASSEMBLY

CROSS-REFERENCE TO RELATED APPLICATIONS

This application claims priority to Chinese Application No. 201910444642.3, filed on May 27, 2019 and entitled "Optical Imaging Lens Assembly," the entire disclosure of which is hereby incorporated by reference.

TECHNICAL FIELD

The present disclosure relates to an optical imaging lens assembly, and in particular to an optical imaging lens assembly including seven lenses.

BACKGROUND

With the rapid development of portable electronic devices, user's requirements for imaging quality and other photographic functions of portable electronic devices, such as smartphones, are increasingly stringent. Further improvement of imaging quality by increasing the number of lenses is the main way to improve mobile phones' imaging. However, improving the imaging quality by simply increasing the number of the lenses is obviously not favorable to the miniaturization of the lens assembly, and the market demand for the mobile phone to be lightweight is not met.

On the other hand, with the diversity of mobile phone applications, a user desires to be able to shoot more scenes in a short distance when shooting using a mobile phone, and therefore, it is necessary to provide a high-definition large-image-plane wide-angle lens to meet the demand. How to design a lens assembly having a higher imaging quality, a sensor capable of matching a higher pixel, and a stronger image processing technology with the size of the lens assembly maintain unchanged or even reduced is a problem urgently to be solved.

SUMMARY

The present disclosure provides an optical imaging lens assembly, such as wide angle lens assembly with a large image plane, the optical imaging lens assembly can be applied to portable electronic products and can at least solve or partially solve at least one of the problems in the existing technology.

On the one hand, the present disclosure provides an optical imaging lens assembly, the optical imaging lens assembly includes, sequentially along an optical axis from an object side to an image side: a first lens having a refractive power, wherein an object-side surface thereof is a concave surface and an image-side surface thereof is a convex surface; a second lens having a refractive power; a third lens having a positive refractive power; a fourth lens having a negative refractive power; a fifth lens having a positive refractive power; a sixth lens having a refractive power, wherein an object-side surface thereof is a convex surface, and an image-side surface thereof is a concave surface; and a seventh lens having a negative refractive power.

In one implementation, the effective focal length f5 of the fifth lens and the effective focal length f3 of the third lens may satisfy: $0.3 < f5/f3 < 1.4$.

In one implementation, the effective focal length f7 of the seventh lens and the effective focal length f4 of the fourth lens may satisfy: $01 < f7/f4 < 1.3$.

In one implementation, the radius of curvature R3 of the object-side surface of the second lens, the radius of curvature R4 of image-side surface of the second lens, and the effective focal length f2 of the second lens may satisfy: $0.1 < (R3+R4)/f2 < 1.0$.

In one implementation, the radius of curvature R7 of the object-side surface of the fourth lens and the radius of curvature R8 of the image-side surface of the fourth lens may satisfy: $0.3 < R7/R8 < 0.8$.

In one implementation, the air spacing T34 between the third lens and the fourth lens on the optical axis, the air spacing T67 between the sixth lens and the seventh lens on the optical axis, and the distance TTL on the optical axis between the object-side surface of the first lens and the image plane of the optical imaging lens assembly, may satisfy: $0.8 < (T34+T67)/TTL*5 < 1.4$.

In one implementation, the central thickness CT3 of the third lens on the optical axis, the central thickness CT1 of the first lens on the optical axis, the central thickness CT2 of the second lens on the optical axis, and the central thickness CT4 of the fourth lens on the optical axis may satisfy: $0.4 < CT3/(CT1+CT2+CT4) < 1.1$.

In one implementation, the maximum effective radius DT11 of the object-side surface of the first lens and the maximum effective radius DT21 of the object-side surface of the second lens may satisfy: $1.1 < DT11/DT21 < 1.7$.

In one implementation, the maximum effective radius DT32 of the image-side surface of the third lens and the maximum effective radius DT22 of the image-side surface of the second lens satisfy: $1.0 < DT32/DT22 < 1.4$.

In one implementation, the total effective focal length f of the optical imaging lens assembly, the radius of curvature R1 of the object-side surface of the first lens, and the radius of curvature R2 of the image-side surface of the first lens can satisfy: $-0.5 < f/(R1+R2) < 0$.

In one implementation, the half of the diagonal length ImgH of the effective pixel region on the image plane of the optical imaging lens assembly may satisfy: $6.0 \text{ mm} < ImgH < 7.0 \text{ mm}$.

In one implementation, the total effective focal length f of the optical imaging lens assembly and the maximal field-of-view FOV of the optical imaging lens assembly may satisfy: $2.3 \text{ mm} < f*\tan(FOV/4) < 2.9 \text{ mm}$.

In one implementation, the maximal field-of-view FOV of the optical imaging lens assembly may satisfy $95° < FOV < 125°$.

In one implementation, the distance TTL on the optical axis between the object-side surface of the first lens and the image plane of the optical imaging lens assembly and the half of a diagonal length ImgH of the effective pixel area on the image plane of the optical imaging lens assembly may satisfy: $TTL/ImgH < 1.3$.

Seven lenses are adopted in the present disclosure, and the optical imaging lens assembly has at least one beneficial effect such as ultra-thinning, high imaging quality, large image plane, wide angle, and so on by rationally distributing the refractive power of each lens, the surface type, the central thickness of each lens, and the on-axis spacing between the lenses.

BRIEF DESCRIPTION OF THE DRAWINGS

By describing non-limiting embodiments below in detail with reference to the accompanying drawings, other features, objectives and advantages of the present disclosure will be more apparent. In the accompanying drawings.

DETAILED DESCRIPTION OF EMBODIMENTS

Figure 1:
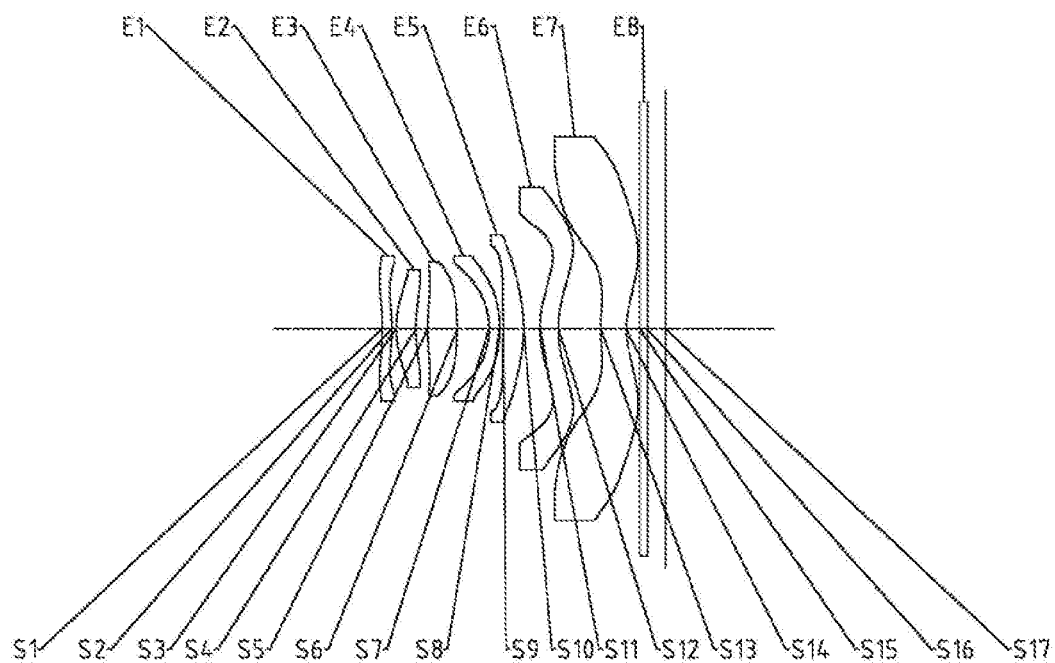
FIG. 1 is a schematic structural diagram illustrating an optical imaging lens assembly according to Embodiment 1.

For a better understanding of the present disclosure, various aspects of the present disclosure will be described in more detail with reference to the accompanying drawings. It should be understood that the detailed description is merely an illustration for the exemplary implementations of the present disclosure rather than a limitation to the scope of the present disclosure in any way. Throughout the specification, the same reference numerals designate the same elements. The expression "and/or" used in this text includes any and all combinations of one or more of the associated listed items.

It should be noted that in the present note, the first, second, third and other expressions are used only to distinguish one feature from another and do not represent any restriction of the feature. Thus, without departing from the teachings of the present disclosure, the first lens discussed below may also be referred to as a second lens or a third lens.

In the drawings, the thickness, size and shape of the lens have been slightly exaggerated for ease of illustration. Specifically, the shape of the spherical or aspherical surface shown in the drawings is shown by way of example. That is, the shape of the sphere or aspherical surface is not limited to the shape of the sphere or aspherical surface shown in the drawings. The drawings are for example only and not strictly proportional.

As used herein, a paraxial region refers to a region near the optical axis. If a surface of a lens is a convex surface and the position of the convex surface is not defined, it indicates that the surface of the lens is a convex surface at least in the paraxial region; if a surface of a lens is a concave surface and the position of the concave surface is not defined, it indicates that the surface of the lens is a concave surface at least in the paraxial region. The surface of each lens closest to the object is referred to as an object-side surface, and the surface of each lens closest to the image plane is referred to as an image-side surface.

It should be further understood that the terms "comprising," "including," "having," and variants thereof, when used in this specification, specify the presence of stated features, entireties, steps, operations, elements and/or components, but do not exclude the presence or addition of one or more other features, entireties, steps, operations, elements, components and/or combinations thereof. As used herein, the term "and/or" includes any and all combinations of one or more of the associated listed items. Expressions, such as "at least one of . . . ," when preceding a list of elements, modify the entire list of elements rather than the individual element in the list. Further, the use of "may," when describing the embodiments of the present disclosure, relates to "one or more embodiments of the present disclosure." In addition, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms, such as those defined in commonly used dictionaries, should be interpreted as having a meaning that is consistent with their meaning in the context of the relevant art and will not be interpreted in an idealized or overly formal sense unless expressly so defined herein.

It should be noted that the embodiments in the present disclosure and the features in the embodiments may be combined with each other on a non-conflict basis. The present disclosure will be described below in detail with reference to the accompanying drawings and in combination with the embodiments.

The features, principles and other aspects of the present disclosure are described in detail below.

An optical imaging lens according to an exemplary embodiment of the present disclosure may include, for example, seven lenses having refractive powers, specifically, a first lens, a second lens, a third lens, a fourth lens, a fifth lens, a sixth lens, and a seventh lens. The seven lenses are arranged sequentially along the optical axis from the object side to the image side. In the first to the seventh lens, there may be an air spacing between any two adjacent lenses.

In an exemplary embodiment, the object-side surface of the first lens may be a concave surface, and the image-side surface of the first lens may be a convex surface; The third lens may have a positive refractive power; The fourth lens may have a negative refractive power; The fifth lens may have a positive refractive power; The object-side surface of the sixth lens may be convex, and the image-side surface of the sixth lens may be concave; The seventh lens may have a negative refractive power.

The first lens, which has a concave object-side surface and a convex image-side surface, bears the function of converging light, in conjunction with the rest six lenses, the focal length can be raised to a maximum extent on the premise that the good converging ability for the light is maintained, and it also helps to reduce the size of the lens assembly. By setting the third lens and the fifth lens each to have a positive power, the ability of correcting the aberration of the lens assembly can be effectively improved, and the sensitivity of the system can be effectively reduced. The negative refractive power of the fourth lens and the negative refractive power of the seventh lens will facilitate the distribution of the refractive powers of the whole lens assembly and avoid the excessive concentration of refractive powers. In addition, the sixth lens having a convex object-side surface and a concave image-side surface helps the lens assembly to balance the vertical axis chromatic aberration and transverse chromatic aberration, and thus guarantees the imaging quality.

In an exemplary embodiment, the second lens may have a positive refractive power, the object-side surface thereof may be convex, and the image-side surface thereof may be concave.

In an exemplary embodiment, the image-side surface of the third lens may be convex; the image-side surface of the fifth lens may be convex; the image-side surface of the seventh lens may be concave.

In an exemplary embodiment, the optical imaging lens assembly of the present disclosure may satisfy the conditional expression: TTL/ImgH<1.3, where TTL is the distance on the axis between the object-side surface of the first lens and the image plane of the optical imaging lens assembly, and ImgH is half the diagonal length of the effective pixel area of the image plane of the optical imaging lens assembly on the optical axis. More specifically, TTL and ImgH may further satisfy: $1.15 \leq TTL/ImgH \leq 1.25$. Satisfying the conditional expression TTT/ImgH<1.3, the overall size of the lens assembly group can be effectively reduced, and the ultra-thin characteristics and miniaturization of the lens assembly group can be realized, thereby enabling the lens group to be better adapted to the increasingly thin electronic products on the market.

In an exemplary embodiment, the optical imaging lens assembly of the present disclosure may satisfy the conditional expression: 0.3<f5/f3<1.4, where f5 is effective focal length of the fifth lens and f3 is effective focal length of the third lens. More specifically, f5 and f3 may further satisfy: $0.34 \leq f5/f3 \leq 1.32$. By reasonably adjusting the refractive powers of the third lens and the fifth lens, on the one hand, the refractive powers of the lens assembly group can be more reasonably distributed without excessive concentration, which is beneficial to improving the imaging quality of the system and reducing the sensitivity of the system, and on the other hand, the ultra-thin characteristics of the lens group can be maintained.

In an exemplary embodiment, the optical imaging lens assembly of the present disclosure may satisfy the conditional expression: 0.1<f7/f4<1.3, where f7 is the refractive power of the seventh lens and f4 is the refractive power of the fourth lens. More specifically, f7 and f4 may further satisfy $0.14 \leq f7/f4 \leq 1.22$. By reasonably controlling the ratio of the effective focal length of the fourth lens to the effective focal length of the seventh lens, the spherical aberration contribution of the fourth lens may controlled within a reasonable range, so that the on-axis field-of-view region of the system has a better imaging quality.

In an exemplary embodiment, the optical imaging lens assembly of the present disclosure may satisfy the conditional expression: 0.1<(R3+R4)/f2<1.0, where R3 is the radius of curvature of the object-side surface of the second lens, R4 is the radius of curvature of the image-side surface of the second lens, and f2 is the effective focal length of the second lens. More specifically, R3, R4 and f2 may further satisfy: $0.16 \leq (R3+R4)/f2 \leq 0.96$. By reasonably controlling the radius of curvature of the object-side surface and image-side surface of the second lenses and the effective focal length of the second lens, the size of the system can be effectively reduced, so that the refractive powers of the system are reasonably distributed and the aberration correction of the subsequent lenses is facilitated, and the second lens can be kept in good process ability.

In an exemplary embodiment, the optical imaging lens assembly of the present disclosure may satisfy the conditional expression: 0.3<R7/R8<0.8, where R7 is radius of curvature of object-side surface of the fourth lens and R8 is radius of curvature of image-side surface of the fourth lens. More specifically, R7 and R8 may further satisfy $0.54 \leq R7/R8 \leq 0.69$. By rationally distributing the radius of curvatures of the object-side surface and image-side surface of the fourth lenses, the astigmatism and coma between the fourth lens and the preceding several lenses can be effectively balanced, so that the lens can maintain better imaging quality. Alternatively, the object-side surface of the fourth lens may be concave and the image-side surface of the fourth lens may be convex.

In an exemplary embodiment, the optical imaging lens assembly of the present disclosure may satisfy the conditional expression: 0.8<(T34+T67)/TTL*5<1.4, where T34 is the air spacing between the third lens and the fourth lens on the optical axis, T67 is the air spacing between the sixth lens and the seventh lens on the optical axis, and TTL is on-axis distance between the object-side surface of the first lens and the image plane. More specifically, T34, T67 and TTL may further satisfy: $0.90 \leq (T34+T67)/TTL*5 \leq 1.31$. By reasonably controlling the ratio of the sum of the air spacing between the third lens and the fourth lens on the optical axis and the air spacing between the sixth lens and the seventh lens on the optical axis to the total track length, the risk of ghost images of the system can be effectively reduced, and size compression of the lens group will be facilitated.

In an exemplary embodiment, the optical imaging lens assembly of the present disclosure may satisfy the conditional expression: 0.4<CT3/(CT1+CT2+CT4)<1.1, where CT3 is the center thickness of the third lens on the optical axis, CT1 is the center thickness of the first lens on the optical axis, CT2 is the center thickness of the second lens on the optical axis, and CT4 is the center thickness of the fourth lens on the optical axis. More specifically, CT3, CT1, CT2, and CT4 may further satisfy $0.46 \leq CT3/(CT1+CT2+CT4) \leq 1.04$. First, it conducive to reduce the size of the system so that there is a lower TTL/EFL ratio; Second, it conducive to reduce the spherical aberration of the system; Third, by controlling the center thickness of the first lens, the second lens, the third lens and the fourth lens within a reasonable range, the amount of the distortion of the system can be effectively reduced, and the ghost image risk due to internal reflection of light is reduced.

In an exemplary embodiment, the optical imaging lens assembly of the present disclosure may satisfy the conditional expression: 1.1<DT11/DT21<1.7, where DT11 is the effective radius of object-side surface of the first lens and DT21 is the effective radius of object-side surface of the second lens. More specifically, DT11 and DT21 may further satisfy $1.20 \leq DT11/DT21 \leq 1.69$. First, it conducive to the system to lift the height of image plane and to increase the effective focal length of the system; second, it conducive to improve the process processability of the first lens and the second lens so that the lens group has higher practicability; third, it enables the system to better balance the aberrations of the edge field of view.

In an exemplary embodiment, the optical imaging lens assembly of the present disclosure may satisfy the conditional expression: 1.0<DT32/DT22<1.4, where DT32 is the effective radius of the image-side surface of the third lens and DT22 is the effective radius of the image-side surface of the second lens. More specifically, DT32 and DT22 may further satisfy 1.14≤DT32/DT22≤1.38. By reasonably controlling the effective radius of the image-side surface of the second lens and the effective radius of the image-side surface of the third lens, the image plane can be effectively lifted, the image quality is improved, edge field of view aberration may be improved, and the image quality of the lens assembly group is improved.

In an exemplary embodiment, the optical imaging lens assembly of the present disclosure may satisfy the conditional expression: −0.5<f/(R1+R2)<0, where f is effective focal length of optical imaging lens assembly, R1 is the radius of curvature of the object-side surface of the first lens, and R2 is the radius of curvature of the image-side surface of the first lens. More specifically, f, R1 and R2 may further satisfy −0.48≤f/(R1+R2)≤−0.06. By rationally distributing the total effective focal length of the lens and the radius of curvatures of the object-side surface and the image-side surface of the first lens, first, it enables the system to have better chromatic aberration correction capability; second, it reduces the sensitivity of the system and effectively avoids a series of processing problems due to the poor process ability of the first lens; and third, it facilitates the lens to maintain its ultra-thin characteristics.

In an exemplary embodiment, the optical imaging lens assembly of the present disclosure may satisfy the conditional expression: 6.0 mm<ImgH<7.0 mm, where ImgH is the half of a diagonal length ImgH of an effective pixel area on an image plane of the optical imaging lens assembly. More specifically, ImgH may further satisfy 6.30 mm≤ImgH≤6.63 mm. Controlling the half of the diagonal length of the effective pixel area on the image plane to 6.0 mm to 7.0 mm, it ensures imaging on a large image plane, and thus more pixels, clear image, and high-quality image quality can be ensured.

In an exemplary embodiment, the optical imaging lens assembly of the present disclosure may satisfy the conditional expression: 2.3 mm<f*tan(FOV/4)<2.9 mm, where f is total effective focal length of optical imaging lens assembly and FOV is the maximal field of view of the optical imaging lens assembly. More specifically, f and FOV may further satisfy 2.33 mm≤f*tan(FOV/4)≤2.85 mm. By controlling this conditional expression within a reasonable range, it conducive for the system to achieve ultra-thin characteristics while allowing the lens to have a wider range of image plane, helping to broaden the range of use of the lens.

In an exemplary embodiment, the above-described optical imaging lens assembly may also include at least one diaphragm. The diaphragm may be provided at an appropriate position as desired, for example, between the first lens and the second lens, or between the second lens and the third lens. Alternatively, the above-mentioned optical imaging lens assembly may also include optical filter for correcting color deviations and/or a protective glass for protecting a photosensitive element located on image plane.

The optical imaging lens assembly according to the above embodiments of the present disclosure may employ multiple lenses, such as seven lenses described above. By rationally distributing the refractive power of each lens, the profile, the center thickness of each lens, the on-axis spacing between each lens, and the like, the volume of the imaging lens assembly can be effectively reduced, the sensitivity of the imaging lens assembly is reduced, and the processability of the imaging lens assembly is improved, so that the optical imaging lens assembly is more favorable for production processing and can be applied to a portable electronic product. the present disclosure provides a high-definition wide-angle prime lens with larger image plane.

In the implementations of the present disclosure, at least one of the surfaces of the lenses is aspheric, specifically, at least one of the object-side surfaces and image-side surfaces of each of the first lens, the second lens, the third lens, the fourth lens, the fifth lens, the sixth lens, and the seventh lens is an aspheric mirror surface. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. By using an aspheric lens, the aberrations that occur during imaging can be eliminated as much as possible, and thus improving the image quality. Alternatively, the object-side surface and image-side surface of each of the first lens, the second lens, the third lens, the fourth lens, the fifth lens, the sixth lens, and the seventh lens are aspherical mirrors.

However, it will be appreciated by those skilled in the art that, without departing from the claimed technical solution of the present disclosure, the number of lenses constituting optical imaging lens assembly may be varied to obtain the various results and advantages described in this specification. For example, although seven lenses have been described in the embodiment, the optical imaging lens assembly is not limited to including seven lenses. If desired, the optical imaging lens assembly may also include other numbers of lenses.

Specific embodiments of an optical imaging lens applicable to the embodiments described above will be further described below with reference to the accompanying drawings.

Embodiment 1

The optical imaging lens according to Embodiment 1 of the present disclosure is described with reference to FIGS. 1 to 2D. FIG. 1 shows a schematic structural diagram illustrating the optical imaging lens assembly according to Embodiment 1 of the present disclosure.

As shown in FIG. 1, the optical imaging lens assembly includes, along the optical axis from the object side to the image side: a first lens E1, a second lens E2, a third lens E3, a fourth lens E4, a fifth lens E5, a sixth lens E6, a seventh lens E7, an optical filter E8 and the image plane S17.

The first lens E1 has a negative refractive power, the object-side surface S1 thereof is concave and the image-side surface S2 thereof is convex; the second lens E2 has a positive refractive power, the object-side surface S3 thereof is convex and the image-side surface S4 thereof is concave; the third lens E3 has a positive refractive power, the object-side surface S5 thereof is convex and the image-side surface S6 thereof is convex; the fourth lens E4 has a negative refractive power, the object-side surface S7 thereof is concave and the image-side surface S8 thereof is convex; The fifth lens E5 has a positive refractive power, the object-side surface S9 thereof is concave and the image-side surface S10 thereof is convex; The sixth lens E6 has a positive refractive power, the object-side surface S11 thereof is convex and the image-side surface S12 thereof is concave; The seventh lens E7 has a negative refractive power, the object-side surface S13 thereof is convex and the image-side surface S14 thereof is concave; the optical filter E8 has an object-side surface S15 and an image-side surface S16. The light from an object sequentially passes through the surfaces S1 to S16 and finally forms an image on the image plane S17.

In the present embodiment, the optical imaging lens assembly may further include a diaphragm STO (not shown) disposed between the first lens E1 and the second lens E2.

Table 1 shows the basic parameter table for the optical imaging lens assembly of Embodiment 1, where the radius of curvature, the thickness and the focal length are all in millimeters (mm).

TABLE 1

| surface number | surface type | radius of curvature | thickness | material refractive index | abbe number | focal length | conic coefficient |
|---|---|---|---|---|---|---|---|
| OBJ | spherical | infinite | infinite | | | | |
| S1 | aspheric | −5.3733 | 0.2540 | 1.66 | 20.4 | −96.53 | −35.3088 |
| S2 | aspheric | −5.9733 | 0.4407 | | | | −52.7030 |
| STO | spherical | infinite | −0.3064 | | | | 0.0000 |
| S3 | aspheric | 3.1060 | 0.5440 | 1.54 | 56.1 | 15.10 | −0.1103 |
| S4 | aspheric | 4.6759 | 0.3322 | | | | −11.5688 |
| S5 | aspheric | 10.0300 | 0.8103 | 1.54 | 55.6 | 7.40 | 12.6389 |
| S6 | aspheric | −6.3929 | 0.8845 | | | | 4.4320 |
| S7 | aspheric | −2.1655 | 0.2911 | 1.67 | 19.2 | −8.64 | 0.1177 |
| S8 | aspheric | −3.6239 | 0.0911 | | | | 0.0708 |
| S9 | aspheric | −32.4752 | 0.5714 | 1.54 | 56.1 | 7.87 | 2.4573 |
| S10 | aspheric | −3.8181 | 0.4568 | | | | −0.2776 |
| S11 | aspheric | 3.2835 | 0.5102 | 1.66 | 20.4 | 83.91 | −3.4625 |
| S12 | aspheric | 3.2712 | 1.1677 | | | | −0.3894 |
| S13 | aspheric | 4.9155 | 0.7021 | 1.54 | 56.1 | −7.61 | −0.3340 |
| S14 | aspheric | 2.1380 | 0.3804 | | | | −1.0336 |
| S15 | spherical | infinite | 0.2100 | 1.52 | 64.2 | | |
| S16 | spherical | infinite | 0.5000 | | | | |
| S17 | spherical | infinite | | | | | |

In the present embodiment, the total effective focal length of the optical imaging lens assembly f=5.49 mm, the distance on the optical axis between the object-side surface S1 of the first lens E1 and the image plane S17 TTL=7.84 mm, and the half of the diagonal length of the effective pixel area on the image plane S17 ImgH=6.50 mm.

In Embodiment 1, the object-side surface and image-side surface of each of the first to seventh lens are aspherical surface, and the surface type x of each aspheric surface is defined by the following formula:

$$x = \frac{ch^2}{1 + \sqrt{1-(k+1)c^2h^2}} + \sum A_i h^i \quad (1)$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient (given in Table 2 above); and $A_i$ is the correction coefficient of the $i^{th}$ order of the aspheric surface. Table 4 below shows the high-order coefficients applicable to the aspheric surfaces S1-S14 of the aspheric lenses in the present embodiment A4, A6, A8, A10, A12, A14, A16, A18 and A20.

TABLE 2

| Surface Number | A4 | A6 | A8 | A10 | A12 | A14 | A16 | A18 | A20 |
|---|---|---|---|---|---|---|---|---|---|
| S1 | −7.4000E−04 | 1.5996E−02 | −7.9600E−03 | 2.5550E−03 | −5.7000E−04 | 5.8100E−05 | 8.3000E−06 | −3.3000E−06 | 2.8862E−07 |
| S2 | −7.0300E−03 | 4.5576E−02 | −4.2640E−02 | 3.0271E−02 | −1.5050E−02 | 4.8270E−03 | −9.2000E−04 | 8.6400E−05 | −2.4771E−06 |
| S3 | −2.8440E−02 | 4.8268E−02 | −8.5320E−02 | 1.1628E−01 | −1.1082E−01 | 6.9200E−02 | −2.6800E−02 | 5.8090E−03 | −5.3768E−04 |
| S4 | −2.0320E−02 | 8.4450E−03 | −5.9700E−03 | 2.1830E−03 | 2.4500E−04 | −9.1000E−04 | 5.1800E−04 | −1.4000E−04 | 1.6648E−05 |
| S5 | −1.1660E−02 | 2.3500E−05 | −5.9800E−03 | 1.1885E−02 | −1.3190E−02 | 8.3910E−03 | −3.0500E−03 | 5.8300E−04 | −4.5008E−05 |
| S6 | −8.2200E−03 | 1.8800E−04 | −3.0000E−03 | 3.2340E−03 | −2.7900E−03 | 1.4570E−03 | −4.3000E−04 | 6.0300E−05 | −2.8115E−06 |
| S7 | −2.9910E−02 | 4.5740E−02 | −6.6030E−02 | 8.5586E−02 | −7.3050E−02 | 3.7844E−02 | −1.1520E−02 | 1.8990E−03 | −1.3029E−04 |
| S8 | −2.8780E−02 | −1.1300E−02 | 2.9251E−02 | −2.0120E−02 | 6.7880E−03 | −1.1600E−03 | 8.2400E−05 | 0.0000E+00 | 0.0000E+00 |
| S9 | 2.9704E−02 | −4.3430E−02 | 3.4133E−02 | −1.7050E−02 | 5.5160E−03 | −1.1800E−03 | 1.6100E−04 | −1.3000E−05 | 4.7391E−07 |
| S10 | 4.0280E−02 | −1.5170E−02 | −3.2300E−03 | 6.4370E−03 | −3.1700E−03 | 8.3200E−04 | −1.2000E−04 | 1.0000E−05 | −3.3602E−07 |
| S11 | 1.0910E−03 | −3.8000E−03 | 6.7900E−04 | −2.6000E−04 | 6.4700E−05 | −7.8000E−06 | 2.8300E−07 | 1.8500E−08 | −1.2625E−09 |
| S12 | −1.9040E−02 | 5.9160E−03 | −3.1900E−03 | 8.0600E−04 | −1.2000E−04 | 1.0600E−05 | −5.7000E−07 | 1.6500E−08 | −2.0115E−10 |
| S13 | −8.1880E−02 | 1.7451E−02 | −3.4100E−03 | 5.4600E−04 | −5.8000E−05 | 3.9000E−06 | −1.6000E−07 | 3.5100E−09 | −3.3333E−11 |
| S14 | −7.7480E−02 | 1.8038E−02 | −3.0600E−03 | 3.4000E−04 | −2.4000E−05 | 1.1100E−06 | −3.1000E−08 | 4.9500E−10 | −3.3842E−12 |

Figure 2A:
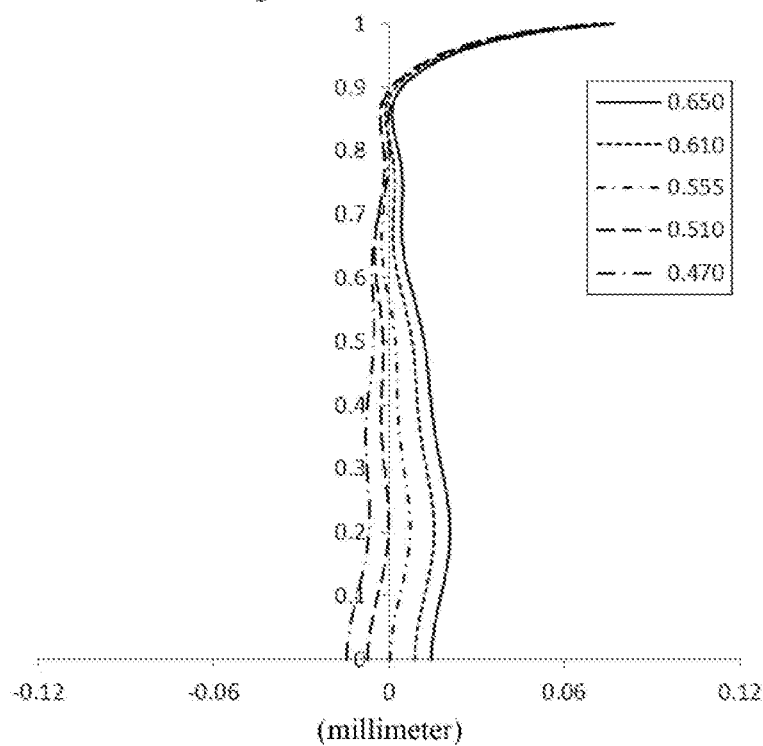
FIGS. 2A-2D respectively illustrate a longitudinal aberration curve, an astigmatic curve, a distortion curve and a lateral color curve of the optical imaging lens assembly according to Embodiment 1.
Figure 2B:
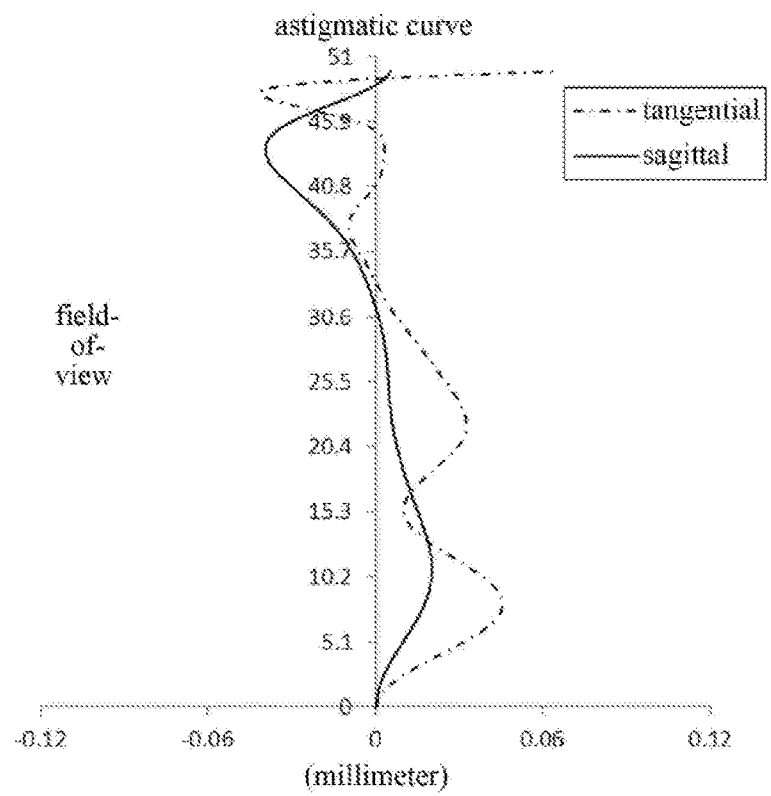
Figure 2C:
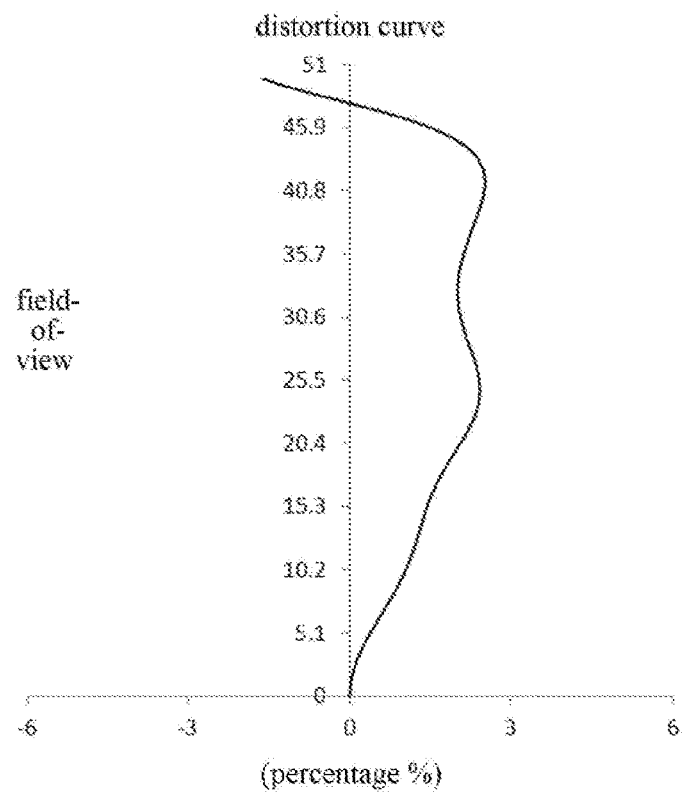
Figure 2D:
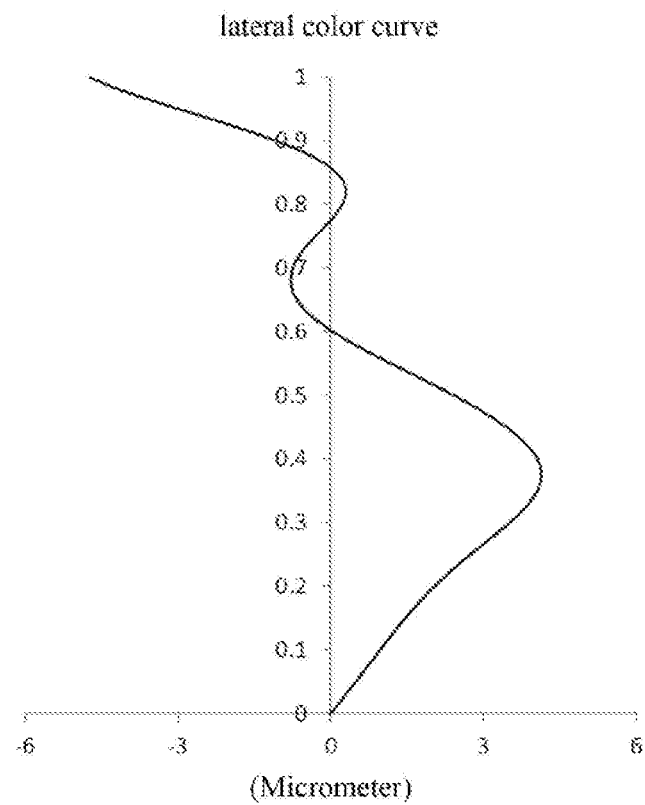

FIG. 2A illustrates the longitudinal aberration curve of the optical imaging lens assembly according to Embodiment 1, representing deviations of images formed by lights of different wavelengths. FIG. 2B illustrates the astigmatic curve of the optical imaging lens assembly according to Embodiment 1, representing a curvature of the tangential image plane and a curvature of the sagittal image plane. FIG. 2C illustrates the distortion curve of the optical imaging lens assembly according to Embodiment 1, representing amounts of distortion at different viewing angles. FIG. 2D illustrates the lateral color curve of the optical imaging lens assembly according to Embodiment 1, representing deviations of different image heights on the image plane after light passing through the optical imaging lens assembly. In summary, with reference to FIGS. 2A to 2D, the optical imaging lens assembly according to Embodiment 1 can achieve good imaging quality.

Embodiment 2

Figure 3:
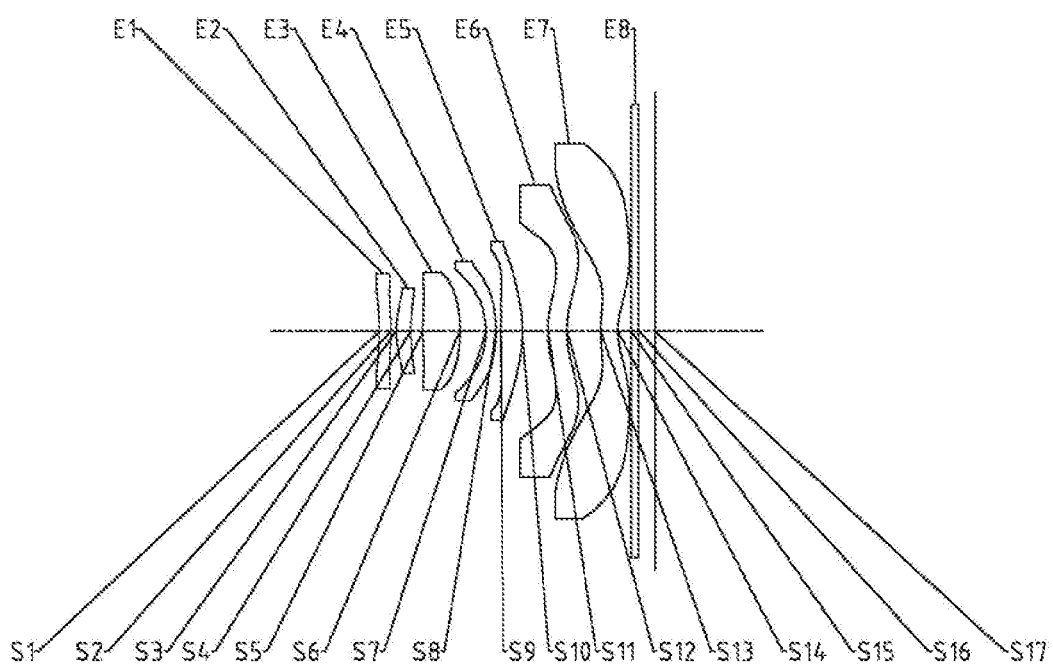
FIG. 3 is a schematic structural diagram illustrating a optical imaging lens assembly according to Embodiment 2.

The optical imaging lens according to Embodiment 2 of the present disclosure is described with reference to FIGS. 3 to 4D. In the present embodiment and following embodiments, the description similar to Embodiment 1 will be omitted for brevity. FIG. 3 shows a schematic structural diagram illustrating the optical imaging lens assembly according to Embodiment 2 of the present disclosure.

As shown in FIG. 3, the optical imaging lens assembly includes, along the optical axis from the object side to the image side: a first lens E1, a second lens E2, a third lens E3, a fourth lens E4, a fifth lens E5, a sixth lens E6, a seventh lens E7, an optical filter E8 and the image plane S17.

The first lens E1 has a negative refractive power, the object-side surface S1 thereof is concave and the image-side surface S2 thereof is convex; the second lens E2 has a positive refractive power, the object-side surface S3 thereof is convex and the image-side surface S4 thereof is concave; the third lens E3 has a positive refractive power, the object-side surface S5 thereof is convex and the image-side surface S6 thereof is convex; the fourth lens E4 has a negative refractive power, the object-side surface S7 thereof is concave and the image-side surface S8 thereof is convex; The fifth lens E5 has a positive refractive power, the object-side surface S9 thereof is convex and the image-side surface S10 thereof is convex; The sixth lens E6 has a negative refractive power, the object-side surface S11 thereof is convex and the image-side surface S12 thereof is concave; The seventh lens E7 has a negative refractive power, the object-side surface S13 thereof is convex and the image-side surface S14 thereof is concave; the optical filter E8 has an object-side surface S15 and an image-side surface S16. The light from an object sequentially passes through the surfaces S1 to S16 and finally forms an image on the image plane S17.

In the present embodiment, the optical imaging lens assembly may further include a diaphragm STO (not shown) disposed between the first lens E1 and the second lens E2.

In the present embodiment, the total effective focal length of the optical imaging lens assembly f=4.96 mm, the distance on the optical axis between the object-side surface S1 of the first lens E1 and the image plane S17 TTL=7.63 mm, and the half of the diagonal length of the effective pixel area on the image plane S17 ImgH=6.63 mm.

Table 3 shows the basic parameter table for the optical imaging lens assembly of Embodiment 2, where the radius of curvature, the thickness and the focal length are all in millimeters (mm). Table 4 below shows the high-order coefficients applicable to the aspheric surfaces in the embodiment 2. The surface type of each aspheric surface may be defined by the formula (1) given in Embodiment 1.

TABLE 3

| surface number | surface type | radius of curvature | thickness | refractive index | abbe number | focal length | conic coefficient |
|---|---|---|---|---|---|---|---|
| OBJ | spherical | infinite | infinite | | | | |
| S1 | aspheric | −4.8328 | 0.3170 | 1.67 | 20.4 | −44.12 | −33.5571 |
| S2 | aspheric | −5.9350 | 0.2965 | | | | −53.4160 |
| STO | spherical | infinite | −0.1501 | | | | 0.0000 |
| S3 | aspheric | 2.8798 | 0.4034 | 1.55 | 56.1 | 13.87 | −1.1304 |
| S4 | aspheric | 4.4172 | 0.3406 | | | | −15.4655 |
| S5 | aspheric | 12.6386 | 1.0197 | 1.54 | 55.9 | 6.37 | −15.6003 |
| S6 | aspheric | −4.5541 | 0.7244 | | | | 4.3648 |
| S7 | aspheric | −2.1742 | 0.2783 | 1.68 | 19.2 | −7.49 | 0.1121 |
| S8 | aspheric | −4.0010 | 0.1297 | | | | 0.4060 |
| S9 | aspheric | 33.5557 | 0.6000 | 1.55 | 56.1 | 6.00 | 2.4573 |
| S10 | aspheric | −3.6097 | 0.7124 | | | | −0.6494 |
| S11 | aspheric | 3.8542 | 0.5271 | 1.67 | 20.4 | −55.09 | −3.7563 |
| S12 | aspheric | 3.2972 | 0.9287 | | | | −0.3887 |
| S13 | aspheric | 4.0721 | 0.4800 | 1.55 | 56.1 | −8.64 | −0.4667 |
| S14 | aspheric | 2.0945 | 0.3655 | | | | −1.0827 |
| S15 | spherical | infinite | 0.2100 | 1.52 | 64.2 | | |
| S16 | spherical | infinite | 0.4502 | | | | |
| S17 | spherical | infinite | | | | | |

TABLE 4

| Surface Number | A4 | A6 | A8 | A10 | A12 | A14 | A16 | A18 | A20 |
|---|---|---|---|---|---|---|---|---|---|
| S1 | 2.8760E−03 | 1.7090E−02 | −1.6560E−02 | 1.3140E−02 | −7.9000E−03 | 3.1700E−03 | −7.8000E−04 | 1.0700E−04 | −6.1112E−06 |
| S2 | 3.0300E−03 | 3.7724E−02 | −4.6820E−02 | 4.6254E−02 | −3.3720E−02 | 1.6685E−02 | −5.2200E−03 | 9.1600E−04 | −6.8091E−05 |

TABLE 4-continued

| Surface Number | A4 | A6 | A8 | A10 | A12 | A14 | A16 | A18 | A20 |
|---|---|---|---|---|---|---|---|---|---|
| S3 | −3.3870E−02 | 4.7053E−02 | −8.4050E−02 | 1.1551E−01 | −1.1082E−01 | 6.9209E−02 | −2.6800E−02 | 5.8050E−03 | −5.5311E−04 |
| S4 | −1.9350E−02 | 7.7780E−03 | −7.7500E−03 | 3.1740E−03 | 2.0700E−04 | −9.3000E−04 | 5.1300E−04 | −1.4000E−04 | 1.7366E−05 |
| S5 | −1.1980E−02 | −2.9000E−03 | −3.4500E−03 | 8.3330E−03 | −1.2360E−02 | 9.7940E−03 | −4.1300E−03 | 8.7500E−04 | −7.2942E−05 |
| S6 | −8.7800E−03 | −7.1900E−03 | 9.9490E−03 | −1.8590E−02 | 1.9358E−02 | −1.1930E−02 | 4.3130E−03 | −8.4000E−04 | 6.8066E−05 |
| S7 | −2.0820E−02 | 6.0622E−02 | −8.8680E−02 | 8.1956E−02 | −5.7750E−02 | 2.9823E−02 | −9.8600E−03 | 1.8090E−03 | −1.3809E−04 |
| S8 | −4.2760E−02 | 4.5792E−02 | −3.2100E−02 | 8.6790E−03 | 1.8300E−04 | −4.8000E−04 | 6.2651E−05 | 0.0000E+00 | 0.0000E+00 |
| S9 | 4.0230E−03 | −1.6990E−02 | 2.0792E−02 | −1.4360E−02 | 5.7390E−03 | −1.4400E−03 | 2.3100E−04 | −2.2000E−05 | 8.8549E−07 |
| S10 | 5.4773E−02 | −5.1900E−02 | 3.2926E−02 | −1.1770E−02 | 2.2000E−03 | −1.6000E−04 | −8.6000E−06 | 2.1000E−06 | −9.3943E−08 |
| S11 | 2.3822E−02 | −3.1560E−02 | 1.3917E−02 | −4.6100E−03 | 1.1210E−03 | −1.9000E−04 | 1.9600E−05 | −1.1000E−06 | 2.7485E−08 |
| S12 | 1.8600E−04 | −1.4370E−02 | 4.0930E−03 | −6.4000E−04 | 6.0500E−05 | −3.3000E−06 | 9.0300E−08 | −6.8000E−10 | −1.1915E−11 |
| S13 | −8.7710E−02 | 1.0663E−02 | 5.0600E−04 | −3.0000E−04 | 3.8800E−05 | −2.7000E−06 | 1.0700E−07 | −2.3000E−09 | 2.1660E−11 |
| S14 | −6.9530E−02 | 1.1511E−02 | −1.2100E−03 | 8.4100E−05 | −4.0000E−06 | 1.3100E−07 | −2.8000E−09 | 3.5700E−11 | −2.0925E−13 |

Figure 4A:
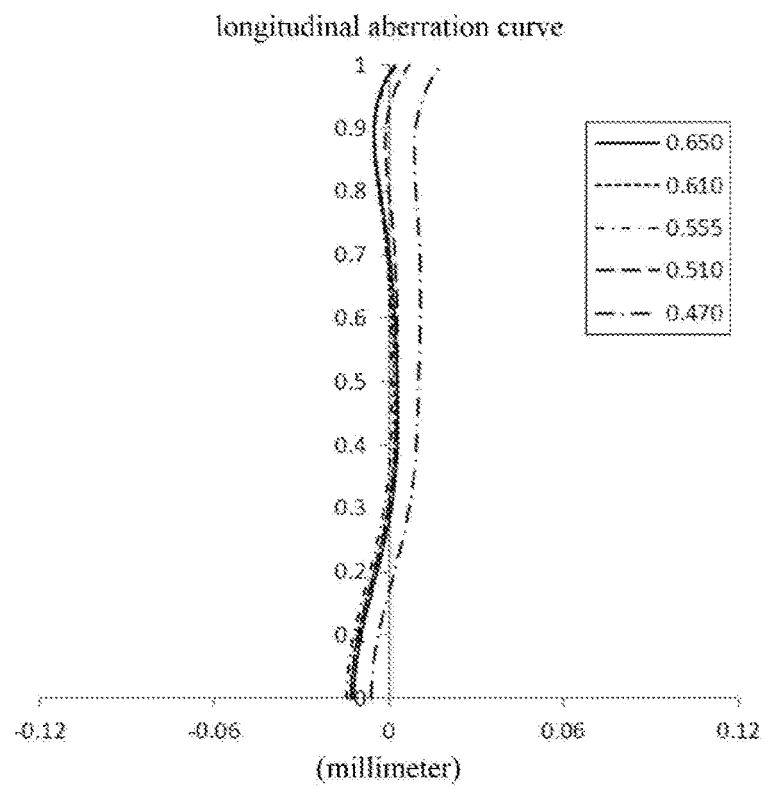
FIGS. 4A-4D respectively illustrate a longitudinal aberration curve, an astigmatic curve, a distortion curve and a lateral color curve of the optical imaging lens assembly according to Embodiment 2.
Figure 4B:
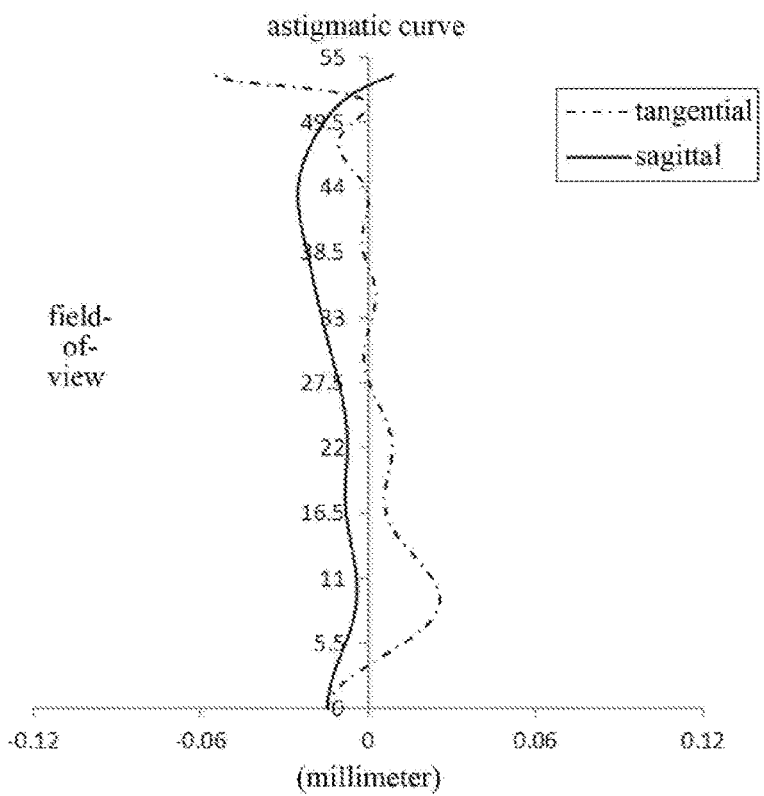
Figure 4C:
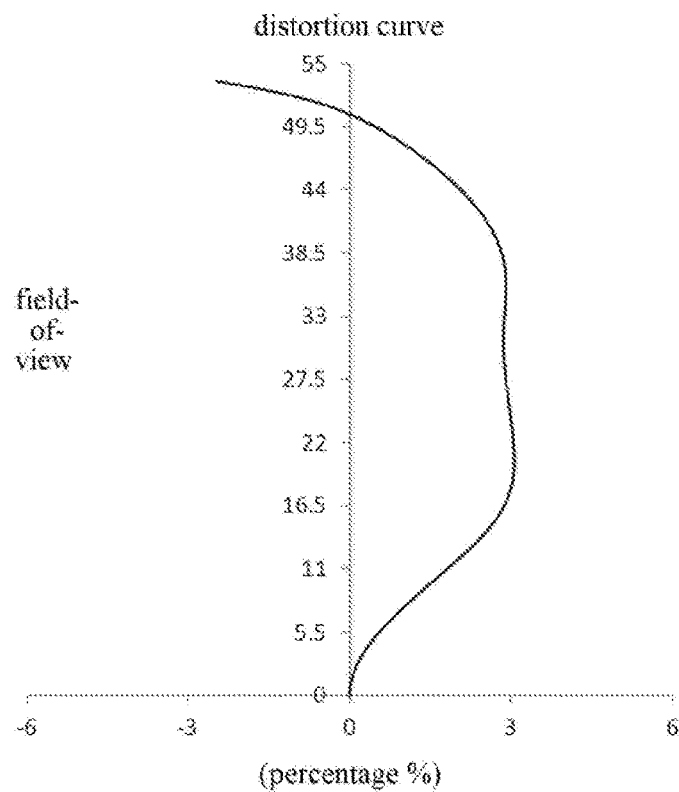
Figure 4D:
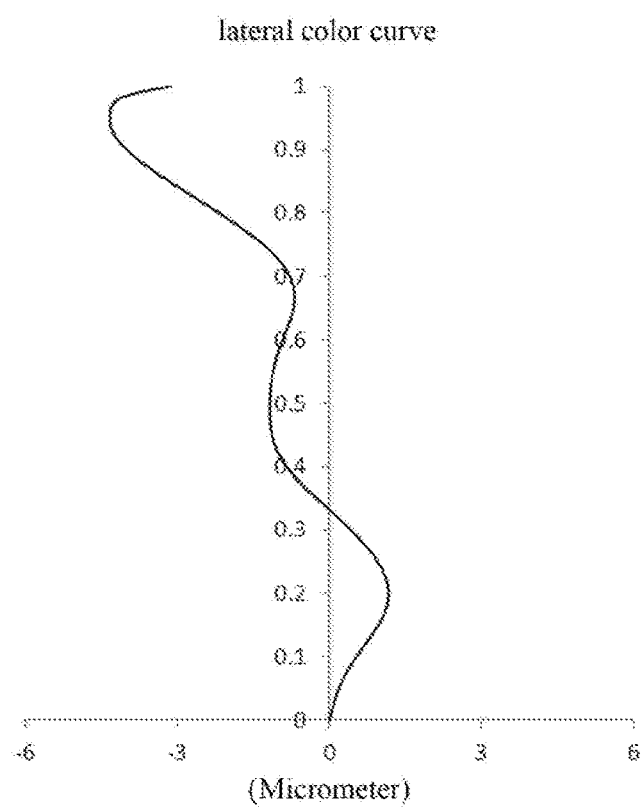

FIG. 4A illustrates the longitudinal aberration curve of the optical imaging lens assembly according to Embodiment 2, representing deviations of images formed by lights of different wavelengths. FIG. 4B illustrates the astigmatic curve of the optical imaging lens assembly according to Embodiment 2, representing a curvature of the tangential image plane and a curvature of the sagittal image plane. FIG. 4C illustrates the distortion curve of the optical imaging lens assembly according to Embodiment 2, representing amounts of distortion at different viewing angles. FIG. 4D illustrates the lateral color curve of the optical imaging lens assembly according to Embodiment 2, representing deviations of different image heights on the image plane after light passing through the optical imaging lens assembly. In summary, with reference to FIGS. 4A to 4D, the optical imaging lens assembly according to Embodiment 2 can achieve good imaging quality.

Embodiment 3

Figure 5:
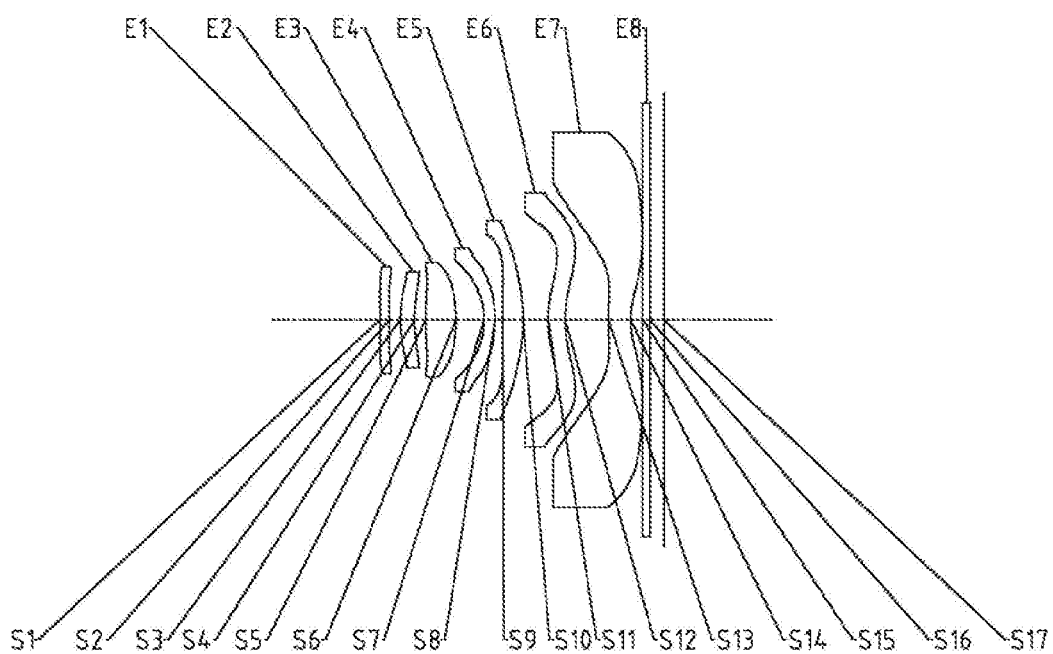
FIG. 5 is a schematic structural diagram illustrating a optical imaging lens assembly according to Embodiment 3.

The optical imaging lens according to Embodiment 3 of the present disclosure is described with reference to FIGS. 5 to 6D. FIG. 5 shows a schematic structural diagram illustrating the optical imaging lens assembly according to Embodiment 3 of the present disclosure.

As shown in FIG. 5, the optical imaging lens assembly includes, along the optical axis from the object side to the image side: a first lens E1, a second lens E2, a third lens E3, a fourth lens E4, a fifth lens E5, a sixth lens E6, a seventh lens E7, an optical filter E8 and the image plane S17.

The first lens E1 has a positive refractive power, the object-side surface S1 thereof is concave and the image-side surface S2 thereof is convex; the second lens E2 has a positive refractive power, the object-side surface S3 thereof is convex and the image-side surface S4 thereof is concave; the third lens E3 has a positive refractive power, the object-side surface S5 thereof is convex and the image-side surface S6 thereof is convex; the fourth lens E4 has a negative refractive power, the object-side surface S7 thereof is concave and the image-side surface S8 thereof is convex; The fifth lens E5 has a positive refractive power, the object-side surface S9 thereof is convex and the image-side surface S10 thereof is convex; The sixth lens E6 has a positive refractive power, the object-side surface S11 thereof is convex and the image-side surface S12 thereof is concave; The seventh lens E7 has a negative refractive power, the object-side surface S13 thereof is convex and the image-side surface S14 thereof is concave; the optical filter E8 has an object-side surface S15 and an image-side surface S16. The light from an object sequentially passes through the surfaces S1 to S16 and finally forms an image on the image plane S17.

In the present embodiment, the optical imaging lens assembly may further include a diaphragm STO (not shown) disposed between the first lens E1 and the second lens E2.

In the present embodiment, the total effective focal length of the optical imaging lens assembly f=5.38 mm, the distance on the optical axis between the object-side surface S1 of the first lens E1 and the image plane S17 TTL=7.88 mm, and the half of the diagonal length of the effective pixel area on the image plane S17 ImgH=6.30 mm.

Table 5 shows the basic parameter table for the optical imaging lens assembly of Embodiment 3, where the radius of curvature, the thickness and the focal length are all in millimeters (mm). Table 6 below shows the high-order coefficients applicable to the aspheric surfaces in the embodiment 3. The surface type of each aspheric surface may be defined by the formula (1) given in Embodiment 1.

TABLE 5

| surface number | surface type | radius of curvature | thickness | refractive index | abbe number | focal length | conic coefficient |
|---|---|---|---|---|---|---|---|
| OBJ | spherical | infinite | infinite | | | | |
| S1 | aspheric | −44.7930 | 0.2593 | 1.67 | 20.4 | 457.59 | −80.0000 |
| S2 | aspheric | −39.2302 | 0.2992 | | | | −80.0000 |
| STO | spherical | infinite | 0.0050 | | | | 0.0000 |
| S3 | aspheric | 3.3340 | 0.3979 | 1.55 | 56.1 | 33.26 | −1.1504 |
| S4 | aspheric | 3.9117 | 0.3129 | | | | −12.7035 |
| S5 | aspheric | 9.5285 | 0.8357 | 1.54 | 55.9 | 5.69 | −8.9854 |
| S6 | aspheric | −4.3550 | 0.7742 | | | | 4.2446 |
| S7 | aspheric | −2.1591 | 0.3023 | 1.68 | 19.2 | −7.82 | 0.0996 |
| S8 | aspheric | −3.8501 | 0.2104 | | | | 0.3099 |

TABLE 5-continued

| surface number | surface type | radius of curvature | thickness | material refractive index | abbe number | focal length | conic coefficient |
|---|---|---|---|---|---|---|---|
| S9 | aspheric | 54.8032 | 0.5698 | 1.55 | 56.1 | 7.52 | 2.4573 |
| S10 | aspheric | −4.4203 | 0.6964 | | | | −0.0300 |
| S11 | aspheric | 3.6960 | 0.4719 | 1.67 | 20.4 | 537.86 | −3.9355 |
| S12 | aspheric | 3.5439 | 1.1931 | | | | −0.3396 |
| S13 | aspheric | 5.5741 | 0.6200 | 1.55 | 56.1 | −7.42 | −0.4073 |
| S14 | aspheric | 2.2534 | 0.3297 | | | | −1.0710 |
| S15 | spherical | infinite | 0.2100 | 1.52 | 64.2 | | |
| S16 | spherical | infinite | 0.3875 | | | | |
| S17 | spherical | infinite | | | | | |

TABLE 6

| Surface Number | A4 | A6 | A8 | A10 | A12 | A14 | A16 | A18 | A20 |
|---|---|---|---|---|---|---|---|---|---|
| S1 | 9.3630E−03 | 3.1610E−03 | 1.0227E−02 | −1.7640E−02 | 1.3945E−02 | −6.3000E−03 | 1.6200E−03 | −2.2000E−04 | 1.2046E−05 |
| S2 | 9.6670E−03 | 1.7873E−02 | −5.5200E−03 | −6.1200E−03 | 8.9995E−03 | −5.0300E−03 | 1.2470E−03 | −1.0000E−04 | −2.7334E−06 |
| S3 | −3.3280E−02 | 4.7216E−02 | −8.4700E−02 | 1.1570E−01 | −1.1083E−01 | 6.9209E−02 | −2.6800E−02 | 5.8050E−03 | −5.5310E−04 |
| S4 | −1.8650E−02 | 7.5770E−03 | −7.7800E−03 | 3.0830E−03 | 1.5001E−04 | −9.3000E−04 | 5.1300E−04 | −1.4000E−04 | 1.7366E−05 |
| S5 | −1.6260E−02 | −1.7900E−03 | −9.0100E−03 | 2.2774E−02 | −2.8657E−02 | 1.9548E−02 | −7.3300E−03 | 1.4210E−03 | −1.1058E−04 |
| S6 | −8.5100E−03 | −1.0700E−02 | 1.5760E−02 | −2.3670E−02 | 2.2976E−02 | −1.3970E−02 | 5.0820E−03 | −1.0000E−03 | 8.1608E−05 |
| S7 | −9.9100E−03 | 6.1010E−03 | −8.1500E−03 | 5.4960E−03 | −2.3768E−03 | 1.4860E−03 | −8.2000E−04 | 2.3600E−04 | −2.4901E−05 |
| S8 | −2.3270E−03 | 6.2100E−04 | 2.1270E−03 | −1.7700E−03 | 8.6300E−04 | −2.2570E−04 | 2.4848E−05 | 0.0000E+00 | 0.0000E+00 |
| S9 | 1.0713E−02 | −2.3170E−02 | 1.5976E−02 | −6.4400E−03 | 1.5153E−03 | −2.0000E−04 | 1.3200E−05 | −2.6000E−09 | −3.5073E−08 |
| S10 | 3.6562E−02 | −2.7560E−02 | 1.3286E−02 | −3.3900E−03 | 3.1625E−04 | 4.2400E−05 | −1.4000E−05 | 1.2700E−06 | −4.1883E−08 |
| S11 | 9.4900E−03 | −1.7830E−02 | 7.1580E−03 | −2.0500E−03 | 4.2730E−04 | −6.5000E−05 | 6.6500E−06 | −3.8000E−07 | 8.9813E−09 |
| S12 | −9.9400E−03 | −8.5600E−03 | 3.0040E−03 | −5.8000E−04 | 6.3709E−05 | −3.9000E−06 | 1.2500E−07 | −1.6000E−09 | −2.4189E−12 |
| S13 | −7.7310E−03 | 6.9040E−03 | 1.6020E−03 | −5.2000E−04 | 6.7285E−05 | −4.9000E−06 | 2.0900E−07 | −4.9000E−09 | 4.9026E−11 |
| S14 | −6.4280E−02 | 1.1511E−02 | −1.4100E−03 | 1.2000E−04 | −7.0472E−06 | 2.7400E−07 | −6.7000E−09 | 9.2400E−11 | −5.4953E−13 |

Figure 6A:
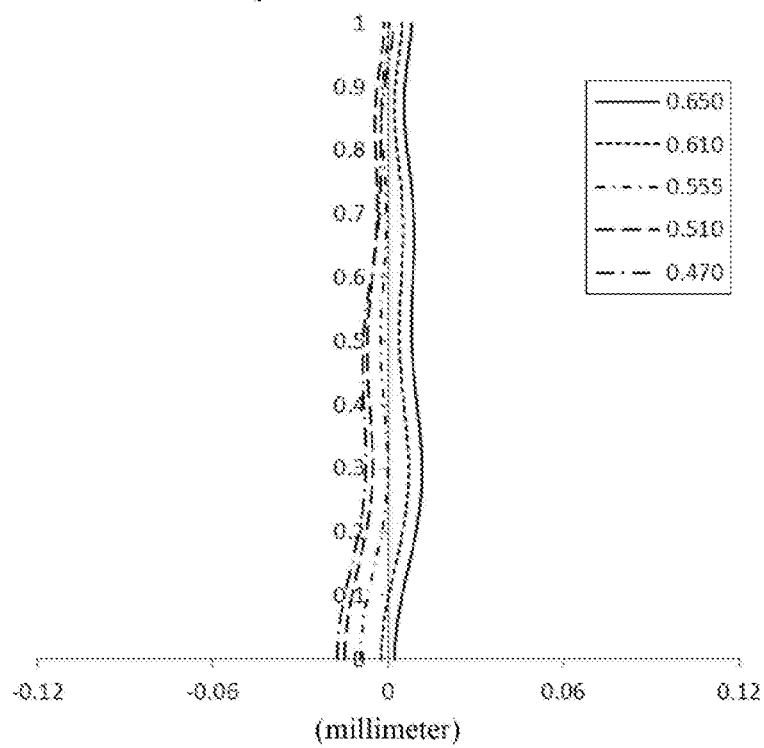
FIGS. 6A-6D respectively illustrate a longitudinal aberration curve, an astigmatic curve, a distortion curve and a lateral color curve of the optical imaging lens assembly according to Embodiment 3.
Figure 6B:
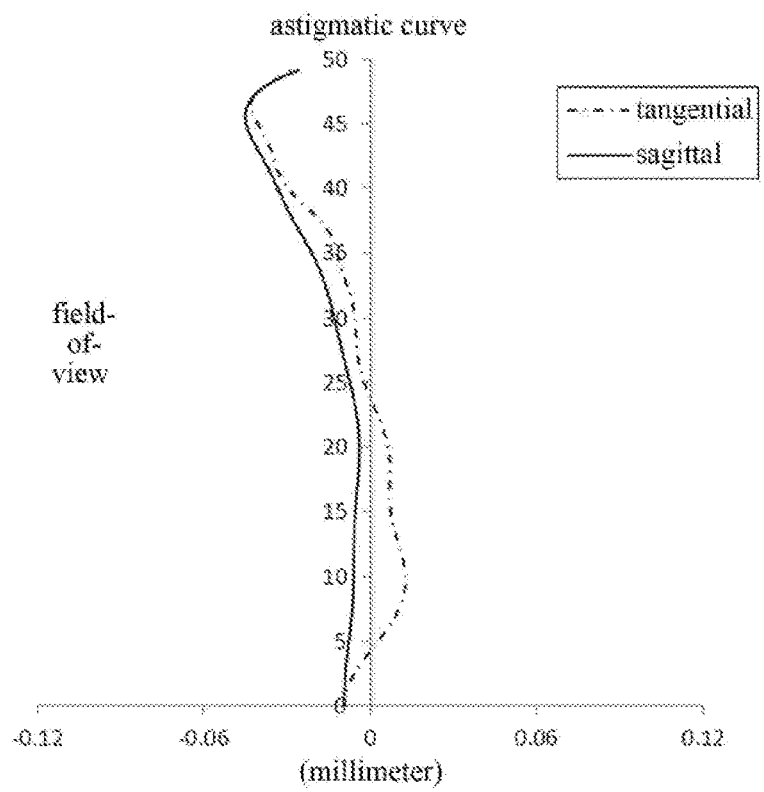
Figure 6C:
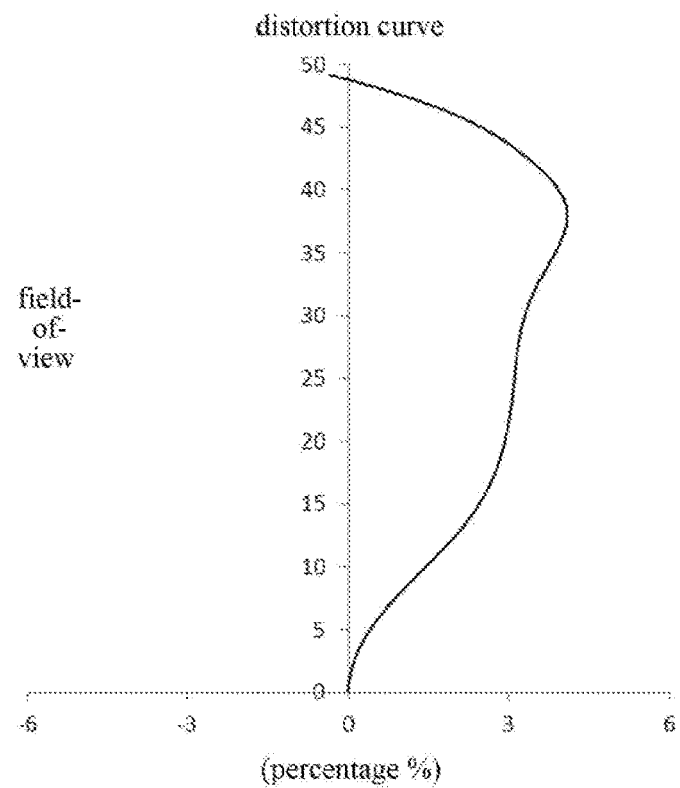
Figure 6D:
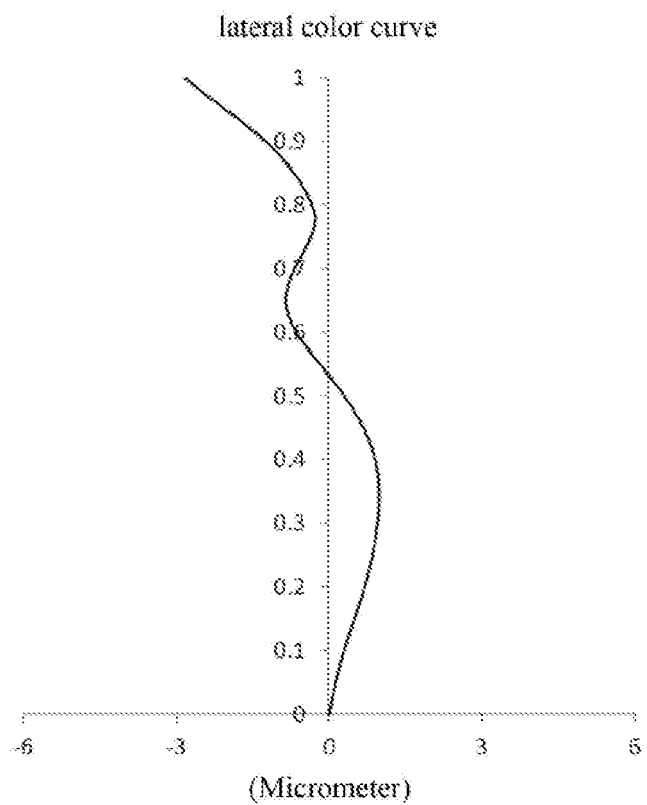

FIG. 6A illustrates the longitudinal aberration curve of the optical imaging lens assembly according to Embodiment 3, representing deviations of images formed by lights of different wavelengths. FIG. 6B illustrates the astigmatic curve of the optical imaging lens assembly according to Embodiment 3, representing a curvature of the tangential image plane and a curvature of the sagittal image plane. FIG. 6C illustrates the distortion curve of the optical imaging lens assembly according to Embodiment 3, representing amounts of distortion at different viewing angles. FIG. 6D illustrates the lateral color curve of the optical imaging lens assembly according to Embodiment 3, representing deviations of different image heights on the image plane after light passing through the optical imaging lens assembly. In summary, with reference to FIGS. 6A to 6D, the optical imaging lens assembly according to Embodiment 3 can achieve good imaging quality.

Embodiment 4

Figure 7:
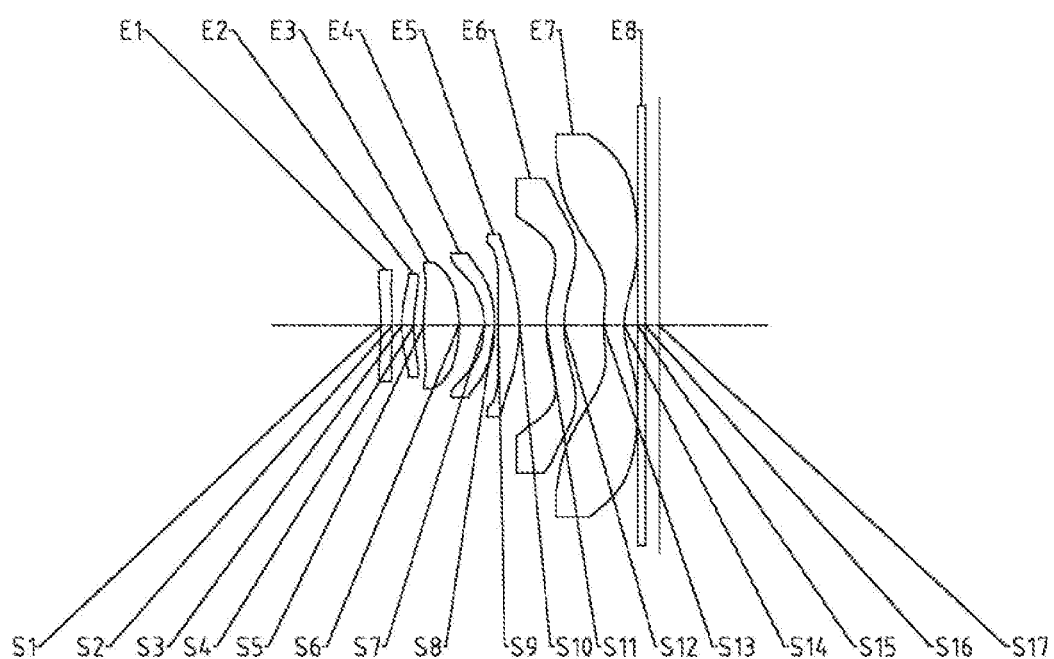
FIG. 7 is a schematic structural diagram illustrating a optical imaging lens assembly according to Embodiment 4.

The optical imaging lens according to Embodiment 4 of the present disclosure is described with reference to FIGS. 7 to 8D. FIG. 7 shows a schematic structural diagram illustrating the optical imaging lens assembly according to Embodiment 4 of the present disclosure.

As shown in FIG. 7, the optical imaging lens assembly includes, along the optical axis from the object side to the image side: a first lens E1, a second lens E2, a third lens E3, a fourth lens E4, a fifth lens E5, a sixth lens E6, a seventh lens E7, an optical filter E8 and the image plane S17.

The first lens E1 has a negative refractive power, the object-side surface S1 thereof is concave and the image-side surface S2 thereof is convex; the second lens E2 has a positive refractive power, the object-side surface S3 thereof is convex and the image-side surface S4 thereof is concave; the third lens E3 has a positive refractive power, the object-side surface S5 thereof is convex and the image-side surface S6 thereof is convex; the fourth lens E4 has a negative refractive power, the object-side surface S7 thereof is concave and the image-side surface S8 thereof is convex; The fifth lens E5 has a positive refractive power, the object-side surface S9 thereof is convex and the image-side surface S10 thereof is convex; The sixth lens E6 has a negative refractive power, the object-side surface S11 thereof is convex and the image-side surface S12 thereof is concave; The seventh lens E7 has a negative refractive power, the object-side surface S13 thereof is convex and the image-side surface S14 thereof is concave; the optical filter E8 has an object-side surface S15 and an image-side surface S16. The light from an object sequentially passes through the surfaces S1 to S16 and finally forms an image on the image plane S17.

In the present embodiment, the optical imaging lens assembly may further include a diaphragm STO (not shown) disposed between the first lens E1 and the second lens E2.

In the present embodiment, the total effective focal length of the optical imaging lens assembly f=4.91 mm, the distance on the optical axis between the object-side surface S1 of the first lens E1 and the image plane S17 TTL=7.70 mm, and the half of the diagonal length of the effective pixel area on the image plane S17 ImgH=6.30 mm.

Table 7 shows the basic parameter table for the optical imaging lens assembly of Embodiment 4, where the radius of curvature, the thickness and the focal length are all in millimeters (mm). Table 8 below shows the high-order coefficients applicable to the aspheric surfaces in the embodiment 4. The surface type of each aspheric surface may be defined by the formula (1) given in Embodiment 1.

TABLE 7

| surface number | surface type | radius of curvature | thickness | material refractive index | material abbe number | focal length | conic coefficient |
|---|---|---|---|---|---|---|---|
| OBJ | spherical | infinite | infinite | | | | |
| S1 | aspheric | −7.0166 | 0.3125 | 1.67 | 20.4 | −136.56 | −33.5720 |
| S2 | aspheric | −7.7382 | 0.2576 | | | | −55.0603 |
| STO | spherical | infinite | 0.0050 | | | | 0.0000 |
| S3 | aspheric | 3.3519 | 0.3359 | 1.55 | 56.1 | 44.58 | −1.4427 |
| S4 | aspheric | 3.7497 | 0.2729 | | | | −13.6963 |
| S5 | aspheric | 7.7135 | 0.9730 | 1.54 | 55.9 | 5.30 | −18.7769 |
| S6 | aspheric | −4.3060 | 0.7022 | | | | 4.1217 |
| S7 | aspheric | −2.1678 | 0.2832 | 1.68 | 19.2 | −7.71 | 0.1005 |
| S8 | aspheric | −3.9005 | 0.1000 | | | | 0.4170 |
| S9 | aspheric | 63.3717 | 0.5953 | 1.55 | 56.1 | 6.48 | 2.4573 |
| S10 | aspheric | −3.7370 | 0.7428 | | | | −0.5734 |
| S11 | aspheric | 3.7437 | 0.4891 | 1.67 | 20.4 | −94.02 | −3.6715 |
| S12 | aspheric | 3.3481 | 1.0932 | | | | −0.3922 |
| S13 | aspheric | 3.9795 | 0.5672 | 1.55 | 56.1 | −9.02 | −0.4058 |
| S14 | aspheric | 2.0906 | 0.3793 | | | | −1.0997 |
| S15 | spherical | infinite | 0.2100 | 1.52 | 64.2 | | |
| S16 | spherical | infinite | 0.3806 | | | | |
| S17 | spherical | infinite | | | | | |

TABLE 8

| surface number | A4 | A6 | A8 | A10 | A12 | A14 | A16 | A18 | A20 |
|---|---|---|---|---|---|---|---|---|---|
| S1 | 8.1460E−03 | 2.5628E−03 | 6.8751E−03 | −1.0130E−02 | 6.6257E−03 | −2.4700E−03 | 5.2400E−04 | −5.8000E−05 | 2.5400E−06 |
| S2 | 1.0226E−02 | 1.2487E−02 | 4.0169E−03 | −1.6300E−02 | 1.4857E−02 | −6.7700E−03 | 1.5150E−03 | −1.3000E−04 | −7.5000E−07 |
| S3 | −3.5017E−02 | 4.6691E−02 | −8.4066E−02 | 1.1505E−01 | −1.1082E−01 | 6.9209E−02 | −2.6800E−02 | 5.8050E−03 | −5.5000E−04 |
| S4 | −1.8337E−02 | 7.3067E−03 | −8.4542E−03 | 2.8470E−03 | 2.0085E−04 | −9.3000E−04 | 5.1300E−04 | −1.4000E−04 | 1.7400E−05 |
| S5 | −9.8430E−03 | 2.0751E−03 | −1.3327E−02 | 2.1096E−02 | 1.3893E−02 | −2.2430E−02 | −4.8800E−03 | 9.0500E−04 | −6.8000E−05 |
| S6 | −5.1700E−03 | −1.7894E−02 | 3.3280E−02 | −4.8510E−02 | 4.3965E−02 | −2.4850E−02 | 8.4040E−03 | −1.5400E−03 | 1.1800E−04 |
| S7 | −1.0764E−02 | 1.5109E−02 | −4.7920E−03 | −2.4720E−02 | 3.3229E−02 | −1.8950E−02 | 5.6990E−03 | −8.8000E−04 | 5.4000E−05 |
| S8 | −3.0311E−02 | 2.3950E−02 | −2.0320E−02 | 8.0710E−03 | −1.2800E−03 | −1.0238E−05 | 1.7322E−05 | 0.0000E+00 | 0.0000E+00 |
| S9 | 9.3835E−03 | −2.4040E−02 | 2.0500E−02 | −9.8800E−03 | 2.7433E−03 | −4.5000E−04 | 4.1100E−05 | −1.9000E−06 | 2.6100E−08 |
| S10 | 4.8198E−02 | −4.9233E−02 | 3.1224E−02 | −1.1080E−02 | 2.1905E−03 | −2.2000E−04 | 6.8100E−06 | 5.4800E−07 | −3.7000E−08 |
| S11 | 2.0396E−02 | −3.0851E−02 | 1.4898E−02 | −5.1000E−03 | 1.2414E−03 | −2.1000E−04 | 2.1800E−05 | −1.3000E−06 | 3.0400E−08 |
| S12 | −5.4980E−03 | −1.2173E−02 | 4.3346E−03 | −8.5000E−04 | 1.0048E−04 | −7.2000E−06 | 3.0100E−07 | −6.9000E−09 | 6.5200E−11 |
| S13 | −9.0231E−02 | 9.8340E−03 | 8.9089E−04 | −3.6000E−04 | 4.4882E−05 | −3.0000E−06 | 1.1700E−07 | −2.5000E−09 | 2.2200E−11 |
| S14 | −6.6290E−02 | 1.1557E−02 | −1.3381E−03 | 1.0500E−04 | −5.4787E−06 | 1.8700E−07 | −3.9000E−09 | 4.6900E−11 | −2.4000E−13 |

Figure 8A:
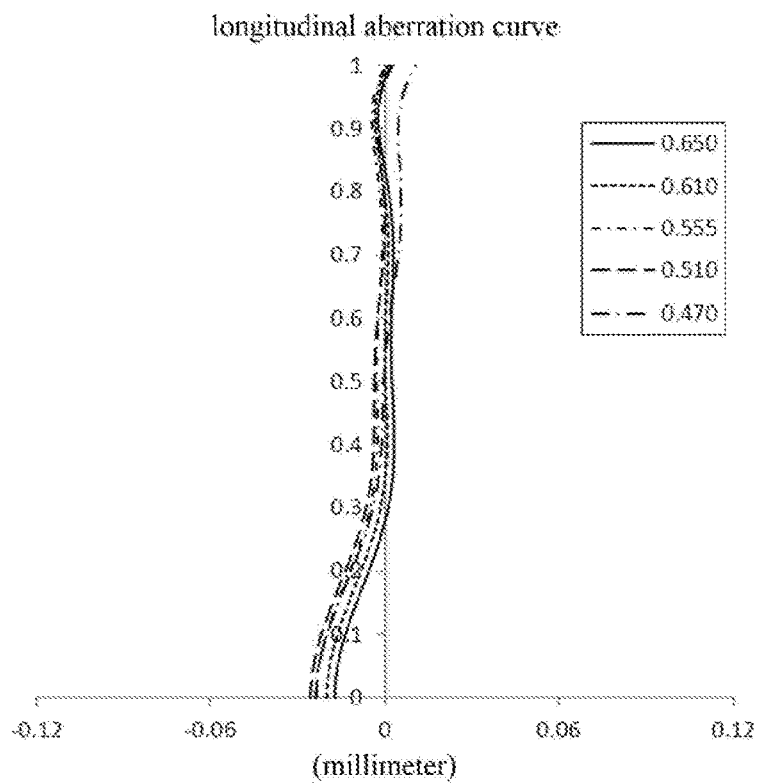
FIGS. 8A-8D respectively illustrate a longitudinal aberration curve, an astigmatic curve, a distortion curve and a lateral color curve of the optical imaging lens assembly according to Embodiment 4.
Figure 8B:
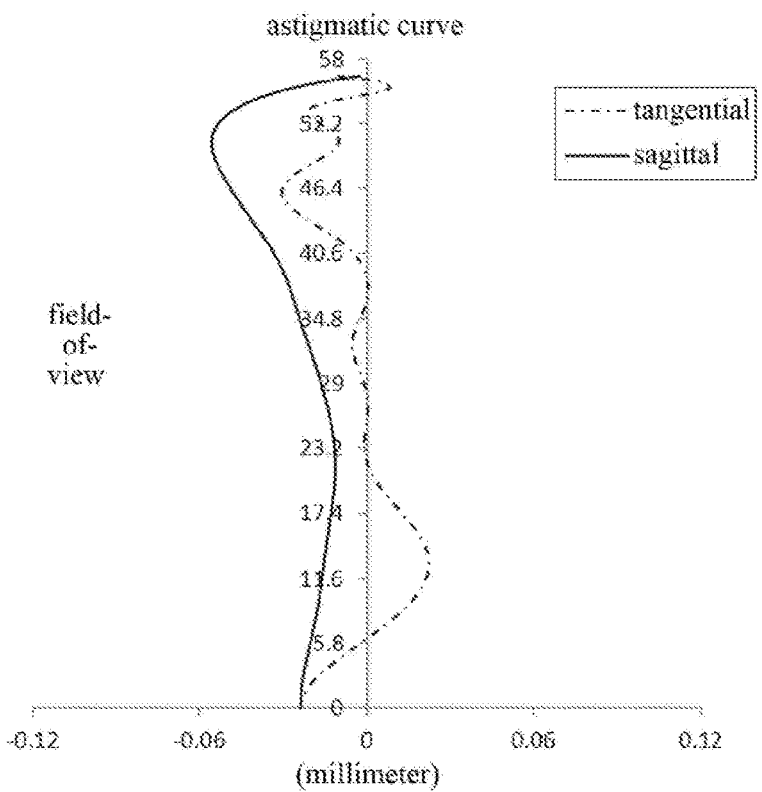
Figure 8C:
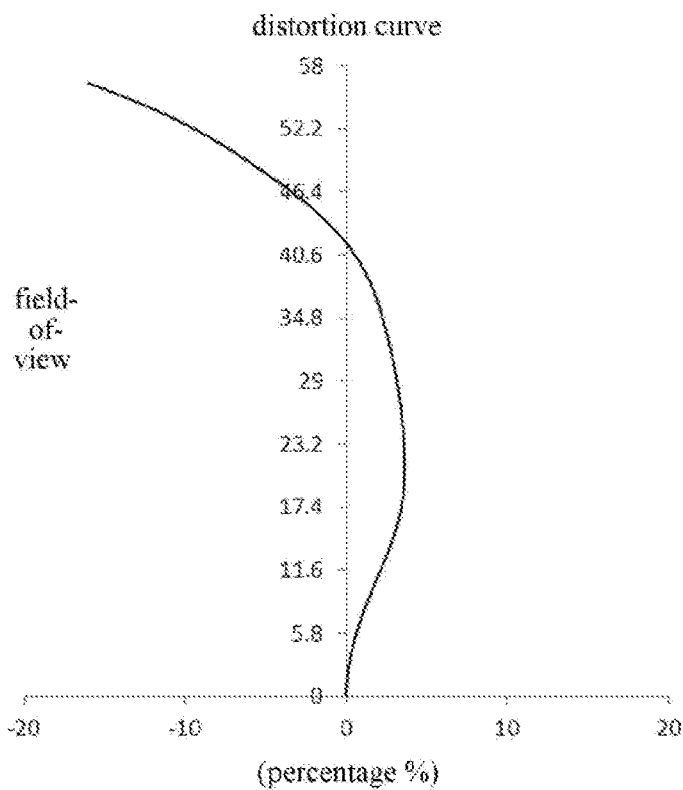
Figure 8D:
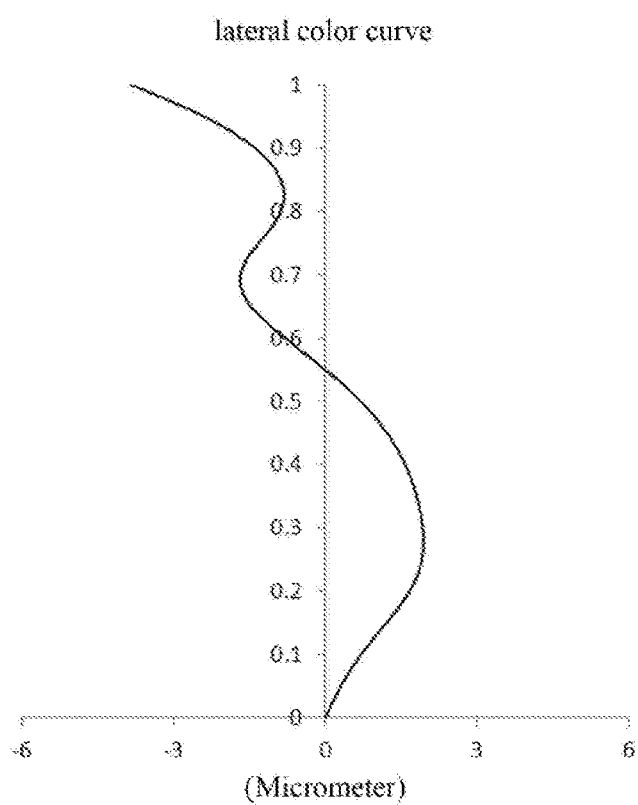

FIG. 8A illustrates the longitudinal aberration curve of the optical imaging lens assembly according to Embodiment 4, representing deviations of images formed by lights of different wavelengths. FIG. 8B illustrates the astigmatic curve of the optical imaging lens assembly according to Embodiment 4, representing a curvature of the tangential image plane and a curvature of the sagittal image plane. FIG. 8C illustrates the distortion curve of the optical imaging lens assembly according to Embodiment 4, representing amounts of distortion at different viewing angles. FIG. 8D illustrates the lateral color curve of the optical imaging lens assembly according to Embodiment 4, representing deviations of different image heights on the image plane after light passing through the optical imaging lens assembly. In summary, with reference to FIGS. 8A to 8D, the optical imaging lens assembly according to Embodiment 4 can achieve good imaging quality.

Embodiment 5

Figure 9:
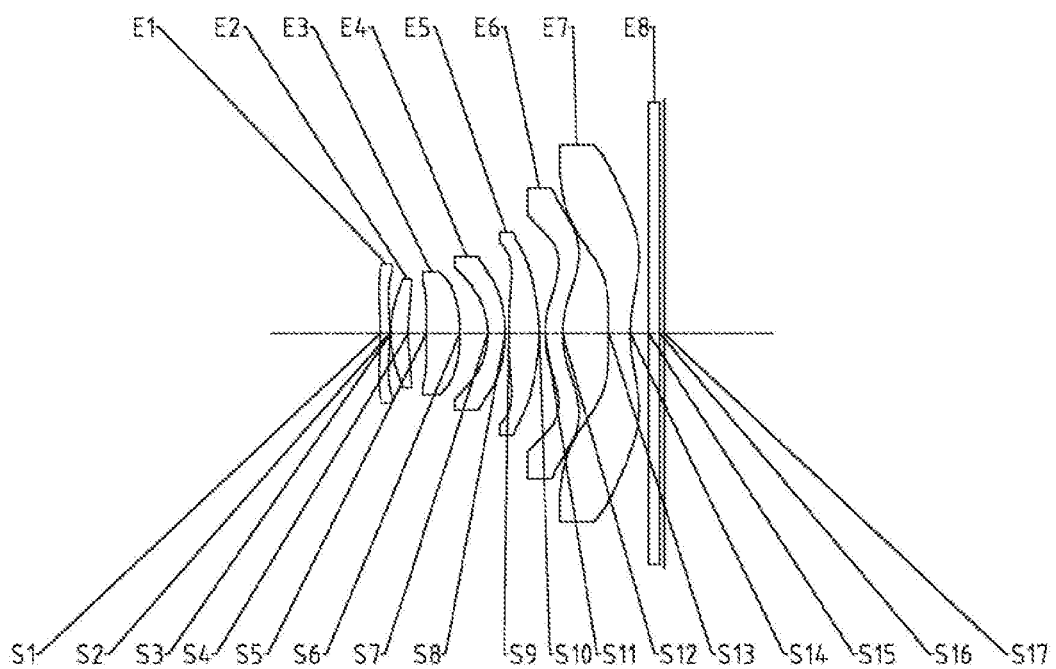
FIG. 9 is a schematic structural diagram illustrating a optical imaging lens assembly according to Embodiment 5.

The optical imaging lens according to Embodiment 5 of the present disclosure is described with reference to FIGS. 9 to 10D. FIG. 9 shows a schematic structural diagram illustrating the optical imaging lens assembly according to Embodiment 5 of the present disclosure.

As shown in FIG. 9, the optical imaging lens assembly includes, along the optical axis from the object side to the image side: a first lens E1, a second lens E2, a third lens E3, a fourth lens E4, a fifth lens E5, a sixth lens E6, a seventh lens E7, an optical filter E8 and the image plane S17.

The first lens E1 has a positive refractive power, the object-side surface S1 thereof is concave and the image-side surface S2 thereof is convex; the second lens E2 has a positive refractive power, the object-side surface S3 thereof is convex and the image-side surface S4 thereof is concave; the third lens E3 has a positive refractive power, the object-side surface S5 thereof is convex and the image-side surface S6 thereof is convex; the fourth lens E4 has a negative refractive power, the object-side surface S7 thereof is concave and the image-side surface S8 thereof is convex; The fifth lens E5 has a positive refractive power, the object-side surface S9 thereof is convex and the image-side surface S10 thereof is convex; The sixth lens E6 has a positive refractive power, the object-side surface S11 thereof is convex and the image-side surface S12 thereof is concave; The seventh lens E7 has a negative refractive power, the object-side surface S13 thereof is convex and the image-side surface S14 thereof is concave; the optical filter E8 has an object-side surface S15 and an image-side surface S16. The light from an object sequentially passes through the surfaces S1 to S16 and finally forms an image on the image plane S17.

In the present embodiment, the optical imaging lens assembly may further include a diaphragm STO (not shown) disposed between the second lens E2 and the third lens E3.

In the present embodiment, the total effective focal length of the optical imaging lens assembly f=5.00 mm, the distance on the optical axis between the object-side surface S1 of the first lens E1 and the image plane S17 TTL=7.87 mm, and the half of the diagonal length of the effective pixel area on the image plane S17 ImgH=6.49 mm.

Table 9 shows the basic parameter table for the optical imaging lens assembly of Embodiment 5, where the radius of curvature, the thickness and the focal length are all in millimeters (mm). Table 10 below shows the high-order coefficients applicable to the aspheric surfaces in the present embodiment. The surface type of each aspheric surface may be defined by the formula (1) given in Embodiment 1.

Embodiment 5, representing a curvature of the tangential image plane and a curvature of the sagittal image plane. FIG. 10C illustrates the distortion curve of the optical imaging lens assembly according to Embodiment 5, representing amounts of distortion at different viewing angles. FIG. 10D illustrates the lateral color curve of the optical imaging lens assembly according to Embodiment 5, representing deviations of different image heights on the image plane after light passing through the optical imaging lens assembly. In summary, with reference to FIGS. 10A to 10D, the optical imaging lens assembly according to Embodiment 5 can achieve good imaging quality.

Embodiment 6

Figure 11:
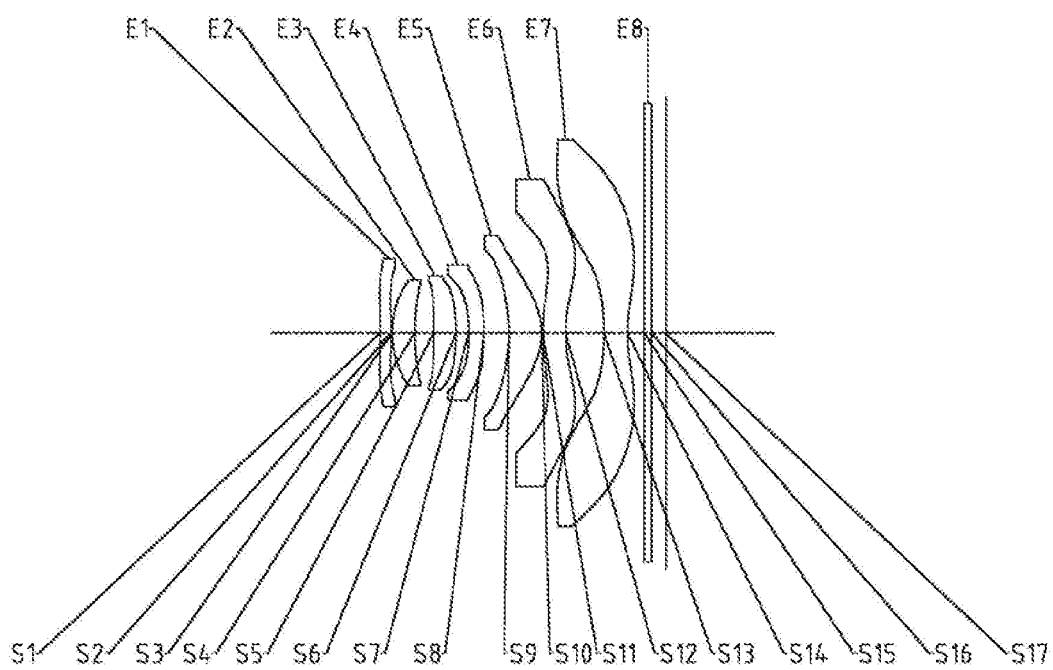
FIG. 11 is a schematic structural diagram illustrating a optical imaging lens assembly according to Embodiment 6.

The optical imaging lens according to Embodiment 6 of the present disclosure is described with reference to FIGS. 11 to 12D. FIG. 11 shows a schematic structural diagram

TABLE 9

| surface number | surface type | radius of curvature | thickness | material refractive index | material abbe number | focal length | conic coefficient |
|---|---|---|---|---|---|---|---|
| OBJ | spherical | infinite | infinite | | | | |
| S1 | aspheric | −6.6467 | 0.2560 | 1.68 | 19.2 | 151.47 | −57.3819 |
| S2 | aspheric | −6.3396 | 0.0308 | | | | −63.4924 |
| S3 | aspheric | 3.1645 | 0.4798 | 1.55 | 56.1 | 12.40 | 1.0955 |
| S4 | aspheric | 5.6227 | 0.1584 | | | | 2.3490 |
| STO | spherical | infinite | 0.3468 | | | | 0.0000 |
| S5 | aspheric | 49.8435 | 0.9278 | 1.55 | 56.1 | 8.52 | −55.2871 |
| S6 | aspheric | −5.0987 | 0.7745 | | | | −0.2581 |
| S7 | aspheric | −2.1341 | 0.4807 | 1.68 | 19.2 | −8.24 | 0.0962 |
| S8 | aspheric | −3.7681 | 0.1055 | | | | −0.0867 |
| S9 | aspheric | 31.1711 | 0.8424 | 1.55 | 56.1 | 6.70 | 78.9036 |
| S10 | aspheric | −4.1011 | 0.1599 | | | | 0.2788 |
| S11 | aspheric | 2.7696 | 0.4819 | 1.68 | 19.2 | 89.13 | −3.6264 |
| S12 | aspheric | 2.6987 | 1.2773 | | | | −1.1013 |
| S13 | aspheric | 23.0289 | 0.6006 | 1.54 | 55.9 | −10.04 | −19445531.0000 |
| S14 | aspheric | 4.3281 | 0.5067 | | | | −0.9202 |
| S15 | spherical | infinite | 0.3100 | 1.52 | 64.2 | | |
| S16 | spherical | infinite | 0.1259 | | | | |
| S17 | spherical | infinite | | | | | |

TABLE 10

| Surface number | A4 | A6 | A8 | A10 | A12 | A14 | A16 | A18 | A20 |
|---|---|---|---|---|---|---|---|---|---|
| S1 | 1.3854E−02 | 7.8051E−03 | −1.2494E−02 | 1.2124E−02 | −7.2600E−03 | 2.6960E−03 | −6.1000E−04 | 7.7400E−05 | −4.2101E−06 |
| S2 | 2.7870E−02 | −1.1647E−02 | 1.1695E−02 | −4.4200E−03 | −9.7000E−04 | 1.7130E−03 | −7.5000E−04 | 1.5100E−04 | −1.2157E−05 |
| S3 | −2.3389E−03 | −2.4459E−02 | 2.0140E−02 | 4.3770E−03 | −2.4870E−02 | 2.3111E−02 | −1.0570E−02 | 2.4610E−03 | −2.2884E−04 |
| S4 | −3.5877E−02 | 1.4555E−02 | −1.6228E−02 | 1.8052E−02 | −1.8170E−02 | 1.4150E−02 | −7.1900E−03 | 2.0520E−03 | −2.4147E−04 |
| S5 | −1.6506E−02 | −5.4905E−03 | 1.5315E−02 | −1.4000E−02 | 1.0940E−02 | −1.2300E−03 | 8.6900E−04 | −2.9000E−04 | 3.7984E−05 |
| S6 | −1.6656E−02 | −1.4077E−02 | 1.9273E−02 | −2.3860E−02 | 1.8488E−02 | −9.0200E−03 | 2.6980E−03 | −4.5000E−04 | 3.2915E−05 |
| S7 | 6.1715E−03 | −1.3761E−02 | 2.1065E−02 | −2.1010E−02 | 1.2125E−02 | −3.5400E−03 | 4.1600E−04 | 1.2700E−05 | −4.6599E−06 |
| S8 | 6.7642E−04 | −1.4984E−02 | 1.4752E−02 | −1.1240E−02 | 5.5160E−03 | −1.6200E−03 | 2.8100E−04 | −2.7000E−05 | 1.1727E−06 |
| S9 | 2.1346E−02 | −1.3982E−02 | 6.4795E−03 | −2.9200E−03 | 9.3800E−04 | −2.0000E−04 | 2.7800E−05 | −2.2000E−06 | 8.0569E−08 |
| S10 | 3.5059E−02 | −2.2130E−02 | 1.4288E−02 | −6.2300E−03 | 1.6930E−03 | −2.9000E−04 | 3.1400E−05 | −1.9000E−06 | 5.0030E−08 |
| S11 | 1.4054E−02 | −1.8517E−02 | 7.3323E−03 | −2.1700E−03 | 4.5100E−04 | −6.2000E−05 | 5.2200E−06 | −2.4000E−07 | 4.7979E−09 |
| S12 | −5.6183E−03 | −7.3294E−03 | 1.6593E−03 | −1.8000E−04 | 8.7100E−06 | 1.7500E−07 | −4.1000E−08 | 1.8300E−09 | −2.8012E−11 |
| S13 | −2.2206E−03 | −3.2388E−03 | 1.3155E−03 | −1.6000E−04 | 1.0200E−05 | −3.9000E−07 | 8.8700E−09 | −1.1000E−10 | 6.0113E−13 |
| S14 | −1.1846E−02 | −1.5644E−03 | 3.7128E−04 | −3.4000E−05 | 1.7500E−06 | −5.4000E−08 | 9.6500E−10 | −8.7000E−12 | 2.6727E−14 |

Figure 10A:
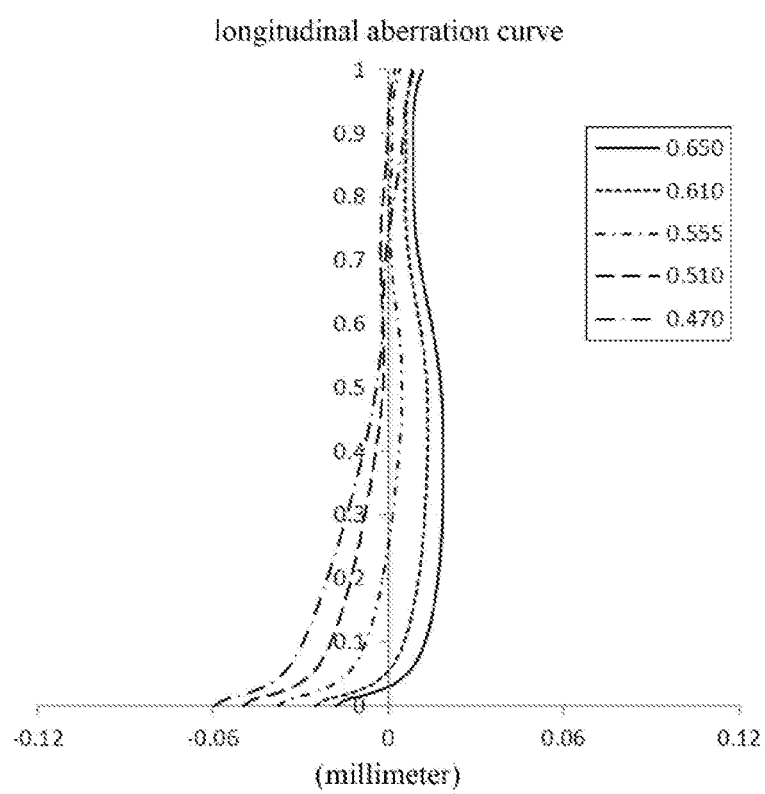
FIGS. 10A-10D respectively illustrate a longitudinal aberration curve, an astigmatic curve, a distortion curve and a lateral color curve of the optical imaging lens assembly according to Embodiment 5.
Figure 10B:
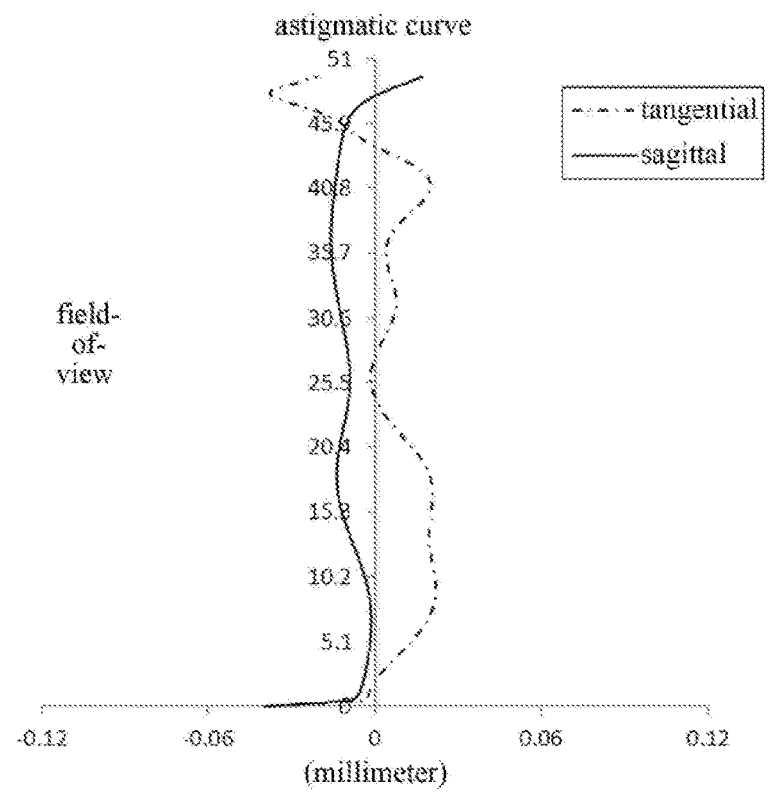
Figure 10C:
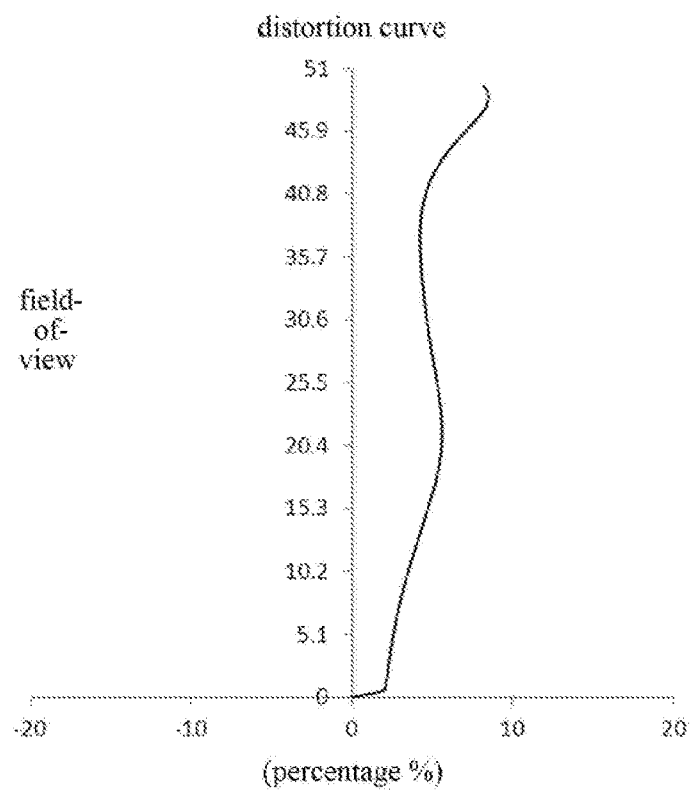
Figure 10D:
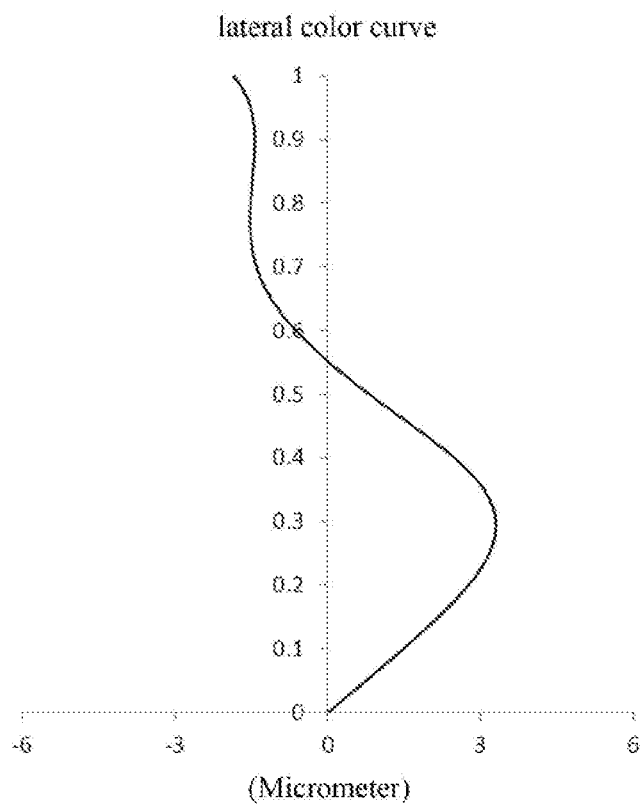

FIG. 10A illustrates the longitudinal aberration curve of the optical imaging lens assembly according to Embodiment 5, representing deviations of images formed by lights of different wavelengths. FIG. 10B illustrates the astigmatic curve of the optical imaging lens assembly according to illustrating the optical imaging lens assembly according to Embodiment 6 of the present disclosure.

As shown in FIG. 11, the optical imaging lens assembly includes, along the optical axis from the object side to the image side: a first lens E1, a second lens E2, a third lens E3, a fourth lens E4, a fifth lens E5, a sixth lens E6, a seventh lens E7, an optical filter E8 and the image plane S17.

The first lens E1 has a positive refractive power, the object-side surface S1 thereof is concave and the image-side surface S2 thereof is convex; the second lens E2 has a positive refractive power, the object-side surface S3 thereof is convex and the image-side surface S4 thereof is concave; the third lens E3 has a positive refractive power, the object-side surface S5 thereof is concave and the image-side surface S6 thereof is convex; the fourth lens E4 has a negative refractive power, the object-side surface S7 thereof is concave and the image-side surface S8 thereof is convex; The fifth lens E5 has a positive refractive power, the object-side surface S9 thereof is concave and the image-side surface S10 thereof is convex; The sixth lens E6 has a negative refractive power, the object-side surface S11 thereof is convex and the image-side surface S12 thereof is concave; The seventh lens E7 has a negative refractive power, the object-side surface S13 thereof is concave and the image-side surface S14 thereof is concave; the optical filter E8 has an object-side surface S15 and an image-side surface S16. The light from an object sequentially passes through the surfaces S1 to S16 and finally forms an image on the image plane S17.

In the present embodiment, the optical imaging lens assembly may further include a diaphragm STO (not shown) disposed between the first lens E1 and the second lens E2.

In the present embodiment, the total effective focal length of the optical imaging lens assembly f=5.64 mm, the distance on the optical axis between the object-side surface S1 of the first lens E1 and the image plane S17 TTL=7.90 mm, and the half of the diagonal length of the effective pixel area on the image plane S17 ImgH=6.54 mm.

Table 11 shows the basic parameter table for the optical imaging lens assembly of Embodiment 6, where the radius of curvature, the thickness and the focal length are all in millimeters (mm). Table 12 below shows the high-order coefficients applicable to the aspheric surfaces in the embodiment 6. The surface type of each aspheric surface may be defined by the formula (1) given in Embodiment 1.

TABLE 11

| surface number | surface type | radius of curvature | thickness | material refractive index | material abbe number | focal length | conic coefficient |
|---|---|---|---|---|---|---|---|
| OBJ | spherical | infinite | infinite | | | | |
| S1 | aspheric | −14.9398 | 0.2897 | 1.65 | 23.5 | 416.06 | 26.5440 |
| S2 | aspheric | −14.2590 | 0.4771 | | | | 14.1208 |
| STO | spherical | infinite | −0.4344 | | | | 0.0000 |
| S3 | aspheric | 2.7898 | 0.6198 | 1.55 | 56.1 | 9.04 | 0.3111 |
| S4 | aspheric | 5.9142 | 0.5246 | | | | 4.7299 |
| S5 | aspheric | −60.6335 | 0.6166 | 1.55 | 56.1 | 15.42 | 98.5117 |
| S6 | aspheric | −7.4206 | 0.3532 | | | | 14.6342 |
| S7 | aspheric | −6.6672 | 0.4172 | 1.68 | 19.2 | −34.19 | −3.8312 |
| S8 | aspheric | −9.5981 | 0.7034 | | | | 2.5772 |
| S9 | aspheric | −4.1844 | 0.8973 | 1.55 | 56.1 | 5.19 | −3.8018 |
| S10 | aspheric | −1.8164 | 0.0353 | | | | −1.4001 |
| S11 | aspheric | 5.8851 | 0.6273 | 1.68 | 19.2 | −15.09 | 0.9382 |
| S12 | aspheric | 3.5741 | 1.0624 | | | | −1.1404 |
| S13 | aspheric | −7.5624 | 0.6538 | 1.54 | 55.9 | −4.77 | −8.4161 |
| S14 | aspheric | 3.9932 | 0.4590 | | | | −0.9362 |
| S15 | spherical | infinite | 0.2100 | 1.52 | 64.2 | | |
| S16 | spherical | infinite | 0.3872 | | | | |
| S17 | spherical | infinite | | | | | |

TABLE 12

| Surface number | A4 | A6 | A8 | A10 | A12 | A14 | A16 | A18 | A20 |
|---|---|---|---|---|---|---|---|---|---|
| S1 | 1.5748E−02 | −6.1008E−05 | −8.2000E−04 | 1.1930E−03 | −6.4107E−04 | 1.5700E−04 | −1.2000E−05 | −1.6000E−06 | 2.4800E−07 |
| S2 | 2.9984E−02 | −2.0529E−02 | 2.8985E−02 | −2.6880E−02 | 1.7261E−02 | −7.4400E−03 | 2.0340E−03 | −3.2000E−04 | 2.1300E−05 |
| S3 | 8.3716E−03 | −1.6103E−02 | 1.9049E−02 | −8.3300E−03 | −3.5685E−03 | 7.4650E−03 | −4.5500E−03 | 1.3390E−03 | −1.6000E−04 |
| S4 | −9.3521E−03 | −2.7242E−02 | 1.1174E−01 | −2.4132E−01 | 3.1575E−01 | −2.5273E−01 | 1.2102E−01 | −3.1760E−02 | 3.5000E−03 |
| S5 | −2.1481E−02 | 2.4789E−02 | −9.3620E−02 | 1.8865E−01 | −2.3299E−01 | 1.7920E−01 | −8.3790E−02 | 2.1796E−02 | −2.4300E−03 |
| S6 | −2.8713E−02 | −7.1822E−03 | 1.7838E−02 | −2.9640E−02 | 3.1411E−02 | −2.0430E−02 | 8.0310E−03 | −1.8000E−03 | 1.7600E−04 |
| S7 | −7.0263E−02 | 5.6532E−02 | −1.6170E−01 | 2.5228E−01 | −2.4099E−01 | 1.4505E−01 | −5.3320E−02 | 1.0858E−02 | −9.3000E−04 |
| S8 | −3.5424E−02 | 1.9045E−02 | −3.3970E−02 | 3.4784E−02 | −2.1727E−02 | 8.6570E−03 | −2.1500E−03 | 3.0100E−04 | −1.8000E−05 |
| S9 | −8.7899E−03 | 2.6278E−02 | −2.3570E−02 | 1.2364E−02 | −4.2760E−03 | 9.6900E−04 | −1.4000E−04 | 1.1000E−05 | −3.7000E−07 |
| S10 | 2.3354E−02 | −7.1662E−03 | 5.4900E−04 | 9.0100E−04 | −4.9083E−04 | 1.2500E−04 | −1.8000E−05 | 1.2800E−06 | −3.8000E−08 |
| S11 | 3.4333E−03 | −1.4162E−02 | 5.0660E−03 | −1.1300E−03 | 1.6797E−04 | −1.8000E−05 | 1.3900E−06 | −6.6000E−08 | 1.3600E−09 |
| S12 | −1.6563E−02 | −3.6001E−03 | 1.6340E−03 | −3.2000E−04 | 3.7188E−05 | −2.6000E−06 | 1.1400E−07 | −2.8000E−09 | 2.9100E−11 |
| S13 | −8.8237E−03 | −3.7085E−03 | 1.1750E−03 | −1.4000E−04 | 9.4877E−06 | −3.9000E−07 | 9.5700E−09 | −1.3000E−10 | 7.8100E−13 |
| S14 | −3.2948E−02 | 5.1491E−03 | −6.9000E−04 | 6.9200E−05 | −4.9128E−06 | 2.3400E−07 | −7.0000E−09 | 1.2100E−10 | −8.9000E−13 |

Figure 12A:
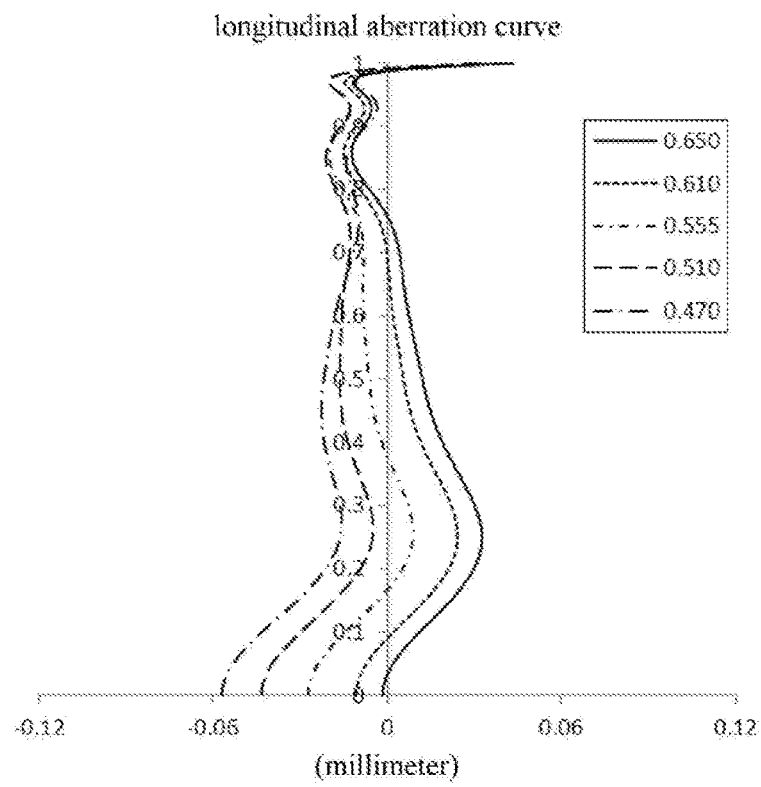
FIGS. 12A-12D respectively illustrate a longitudinal aberration curve, an astigmatic curve, a distortion curve and a lateral color curve of the optical imaging lens assembly according to Embodiment 6.
Figure 12B:
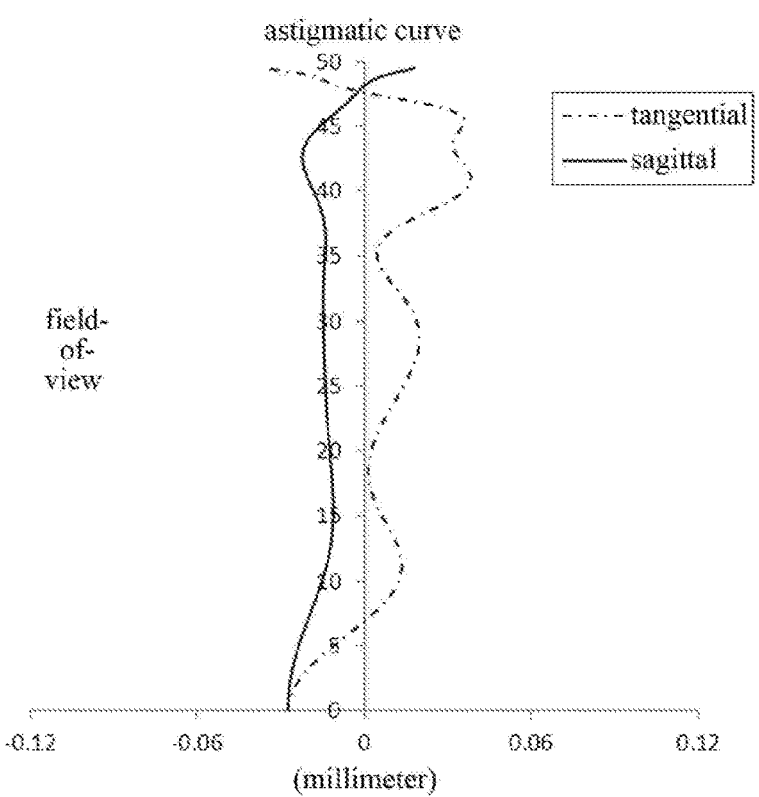
Figure 12C:
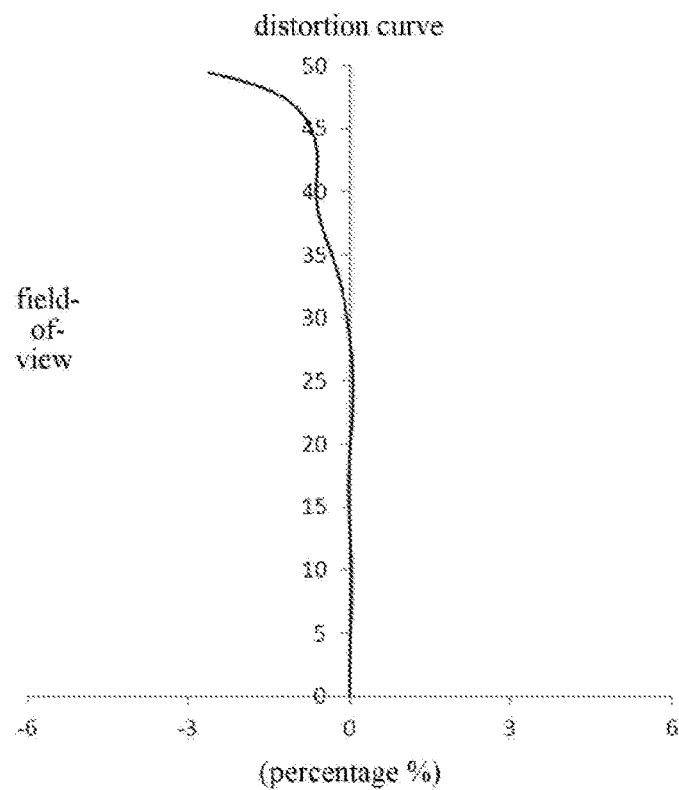
Figure 12D:
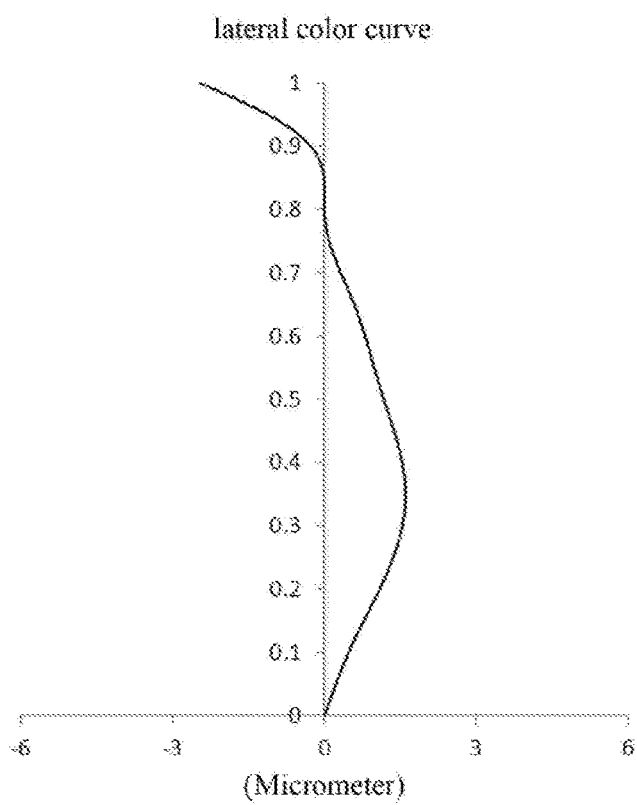

FIG. 12A illustrates the longitudinal aberration curve of the optical imaging lens assembly according to Embodiment 6, representing deviations of images formed by lights of different wavelengths. FIG. 12B illustrates the astigmatic curve of the optical imaging lens assembly according to Embodiment 6, representing a curvature of the tangential image plane and a curvature of the sagittal image plane. FIG. 13C illustrates the distortion curve of the optical imaging lens assembly according to Embodiment 6, representing amounts of distortion at different viewing angles. FIG. 12D illustrates the lateral color curve of the optical imaging lens assembly according to Embodiment 6, representing deviations of different image heights on the image plane after light passing through the optical imaging lens assembly. In summary, with reference to FIGS. 12A to 12D, the optical imaging lens assembly according to Embodiment 6 can achieve good imaging quality.

Embodiment 7

Figure 13:
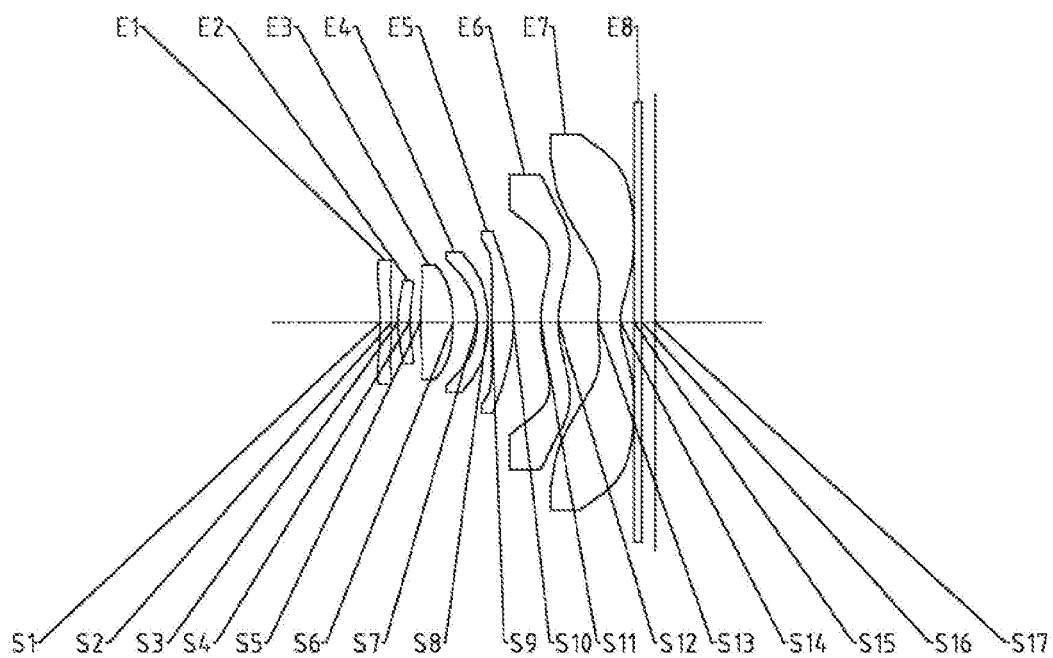
FIG. 13 is a schematic structural diagram illustrating a optical imaging lens assembly according to Embodiment 7.

The optical imaging lens according to Embodiment 7 of the present disclosure is described with reference to FIGS. 13 to 14D. FIG. 13 shows a schematic structural diagram illustrating the optical imaging lens assembly according to Embodiment 7 of the present disclosure.

As shown in FIG. 13, the optical imaging lens assembly includes, along the optical axis from the object side to the image side: a first lens E1, a second lens E2, a third lens E3, a fourth lens E4, a fifth lens E5, a sixth lens E6, a seventh lens E7, an optical filter E8 and the image plane S17.

The first lens E1 has a negative refractive power, the object-side surface S1 thereof is concave and the image-side surface S2 thereof is convex; the second lens E2 has a positive refractive power, the object-side surface S3 thereof is convex and the image-side surface S4 thereof is concave; the third lens E3 has a positive refractive power, the object-side surface S5 thereof is convex and the image-side surface S6 thereof is convex; the fourth lens E4 has a negative refractive power, the object-side surface S7 thereof is concave and the image-side surface S8 thereof is convex; The fifth lens E5 has a positive refractive power, the object-side surface S9 thereof is convex and the image-side surface S10 thereof is convex; The sixth lens E6 has a negative refractive power, the object-side surface S11 thereof is convex and the image-side surface S12 thereof is concave; The seventh lens E7 has a negative refractive power, the object-side surface S13 thereof is convex and the image-side surface S14 thereof is concave; the optical filter E8 has an object-side surface S15 and an image-side surface S16. The light from an object sequentially passes through the surfaces S1 to S16 and finally forms an image on the image plane S17.

In the present embodiment, the optical imaging lens assembly may further include a diaphragm STO (not shown) disposed between the first lens E1 and the second lens E2.

In the present embodiment, the total effective focal length of the optical imaging lens assembly f=4.94 mm, the distance on the optical axis between the object-side surface S1 of the first lens E1 and the image plane S17 TTL=7.60 mm, and the half of the diagonal length of the effective pixel area on the image plane S17 ImgH=6.30 mm.

Table 13 shows the basic parameter table for the optical imaging lens assembly of Embodiment 7, where the radius of curvature, the thickness and the focal length are all in millimeters (mm). Table 14 below shows the high-order coefficients applicable to the aspheric surfaces in the embodiment 7. The surface type of each aspheric surface may be defined by the formula (1) given in Embodiment 1.

TABLE 13

| surface number | Surface type | radius of curvature | thickness | material refractive index | abbe number | focal length | conic coefficient |
|---|---|---|---|---|---|---|---|
| OBJ | spherical | infinite | infinite | | | | |
| S1 | aspheric | −5.9497 | 0.3117 | 1.67 | 20.4 | −100.33 | −31.7178 |
| S2 | aspheric | −6.6677 | 0.3064 | | | | −56.7628 |
| STO | spherical | infinite | −0.1368 | | | | 0.0000 |
| S3 | aspheric | 3.3282 | 0.3324 | 1.55 | 56.1 | 37.20 | −1.3559 |
| S4 | aspheric | 3.8400 | 0.2946 | | | | −13.7457 |
| S5 | aspheric | 8.3763 | 0.9000 | 1.54 | 55.9 | 5.34 | −15.5794 |
| S6 | aspheric | −4.1997 | 0.6775 | | | | 3.9075 |
| S7 | aspheric | −2.1763 | 0.2984 | 1.68 | 19.2 | −7.79 | 0.0987 |
| S8 | aspheric | −3.9076 | 0.1000 | | | | 0.4708 |
| S9 | aspheric | 71.8258 | 0.6000 | 1.55 | 56.1 | 6.55 | 2.4573 |
| S10 | aspheric | −3.7507 | 0.7571 | | | | −0.4743 |
| S11 | aspheric | 3.7254 | 0.4913 | 1.67 | 20.4 | −94.76 | −3.5994 |
| S12 | aspheric | 3.3323 | 1.0977 | | | | −0.3952 |
| S13 | aspheric | 4.0032 | 0.6177 | 1.55 | 56.1 | −7.85 | −0.3975 |
| S14 | aspheric | 1.9567 | 0.3798 | | | | −1.1307 |
| S15 | spherical | infinite | 0.2100 | 1.52 | 64.2 | | |
| S16 | spherical | infinite | 0.3620 | | | | |
| S17 | spherical | infinite | | | | | |

TABLE 13

| Surface number | A4 | A6 | A8 | A10 | A12 | A14 | A16 | A18 | A20 |
|---|---|---|---|---|---|---|---|---|---|
| S1 | 5.7022E−03 | 8.6580E−03 | −3.2578E−03 | 9.5400E−05 | 2.4000E−04 | −2.7000E−06 | −5.0000E−05 | 1.5400E−05 | −1.3965E−06 |
| S2 | 6.8267E−03 | 2.2449E−02 | −1.0077E−02 | −3.0900E−03 | 6.9220E−03 | −3.7900E−03 | 8.4200E−04 | −4.5000E−05 | −5.2368E−06 |
| S3 | −3.4746E−02 | 4.6687E−02 | −8.4170E−02 | 1.1502E−01 | −1.1082E−01 | 6.9209E−02 | −2.6800E−02 | 5.8050E−03 | −5.5311E−04 |

TABLE 13-continued

| Surface number | A4 | A6 | A8 | A10 | A12 | A14 | A16 | A18 | A20 |
|---|---|---|---|---|---|---|---|---|---|
| S4 | −1.8056E−02 | 7.6720E−03 | −8.3497E−03 | 2.7500E−03 | 1.4500E−04 | −9.3000E−04 | 5.1300E−04 | −1.4000E−04 | 1.7366E−05 |
| S5 | −8.5683E−03 | 8.2450E−03 | −3.2714E−02 | 5.0280E−02 | −4.7150E−02 | 2.5978E−02 | −8.2500E−03 | 1.4040E−03 | −9.8535E−05 |
| S6 | −7.0075E−03 | −8.1100E−03 | 1.3818E−02 | −2.5410E−02 | 2.6256E−02 | −1.6130E−02 | 5.7560E−03 | −1.0900E−03 | 8.5308E−05 |
| S7 | −3.8490E−04 | −1.8130E−02 | 3.1280E−02 | −3.1550E−02 | 1.6511E−02 | −3.6900E−03 | −8.2000E−05 | 1.8200E−04 | −2.2560E−05 |
| S8 | −1.8210E−02 | −1.4439E−02 | 2.4945E−02 | −1.8990E−02 | 7.4970E−03 | −1.4800E−03 | 1.1800E−04 | 0.0000E+00 | 0.0000E+00 |
| S9 | 7.7368E−03 | −1.9800E−02 | 1.5120E−02 | −5.8400E−03 | 9.3500E−04 | 3.2800E−05 | −3.3000E−05 | 4.3200E−06 | −1.8579E−07 |
| S10 | 3.5023E−02 | −2.0350E−02 | 4.4862E−03 | 2.7960E−03 | −2.2000E−03 | 6.4100E−04 | −9.5000E−05 | 7.2200E−06 | −2.2069E−07 |
| S11 | 1.4096E−02 | −2.2190E−02 | 9.5647E−03 | −3.1100E−03 | 7.5300E−04 | −1.3000E−04 | 1.3800E−05 | −8.1000E−07 | 1.9719E−08 |
| S12 | −5.6334E−03 | −1.1750E−02 | 4.0653E−03 | −7.8000E−04 | 8.9300E−05 | −6.2000E−06 | 2.5000E−07 | −5.4000E−09 | 4.6523E−11 |
| S13 | −8.9375E−02 | 9.5100E−03 | 9.5028E−04 | −3.7000E−04 | 4.5100E−05 | −3.0000E−06 | 1.1500E−07 | −2.4000E−09 | 2.1520E−11 |
| S14 | −7.3862E−02 | 1.3326E−02 | −1.5008E−03 | 1.0700E−04 | −4.6000E−06 | 1.1400E−07 | −1.2000E−09 | −2.4000E−12 | 1.1207E−13 |

Figure 14A:
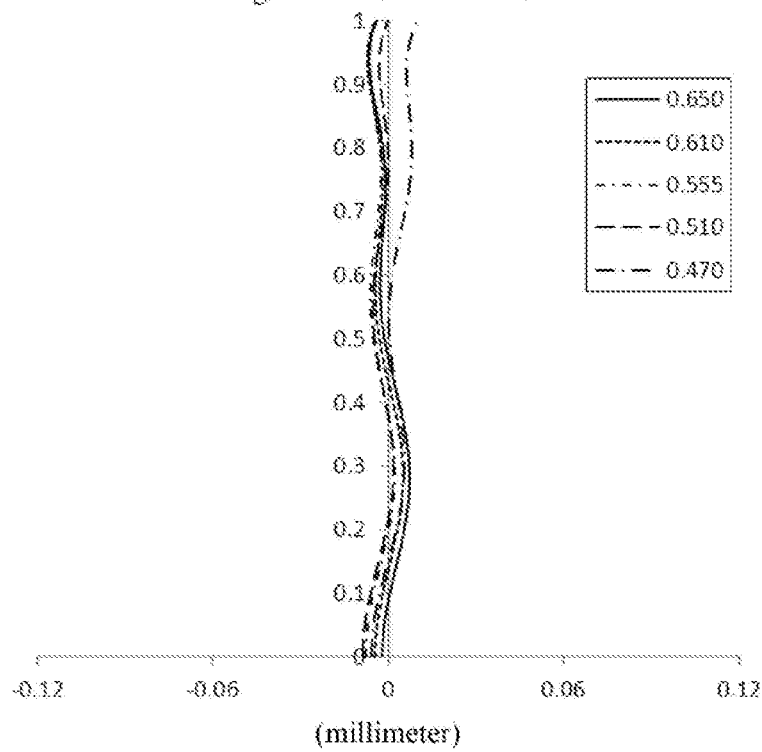
FIGS. 14A-14D respectively illustrate a longitudinal aberration curve, an astigmatic curve, a distortion curve and a lateral color curve of the optical imaging lens assembly according to Embodiment 7.
Figure 14B:
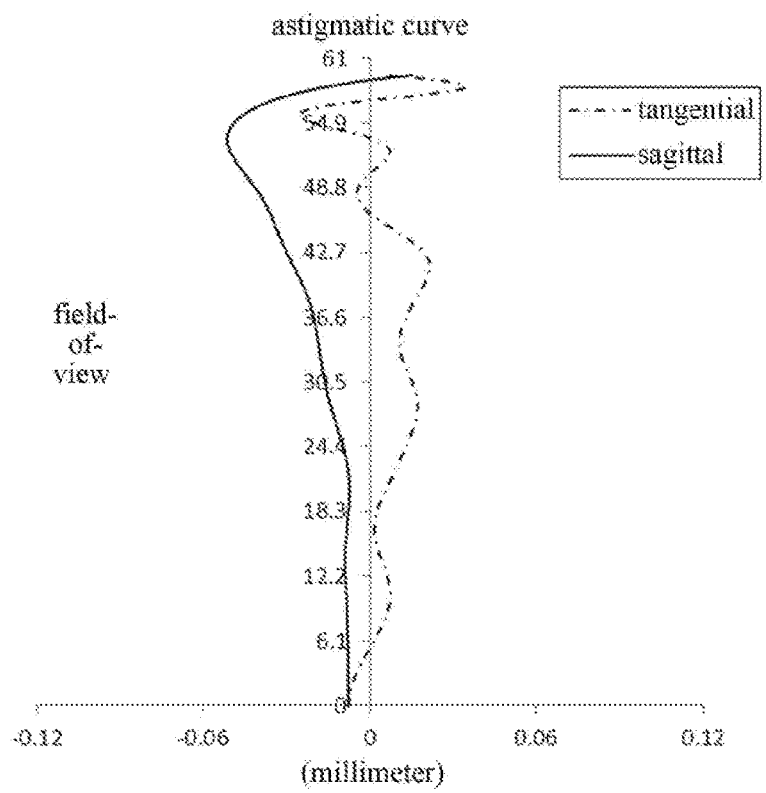
Figure 14C:
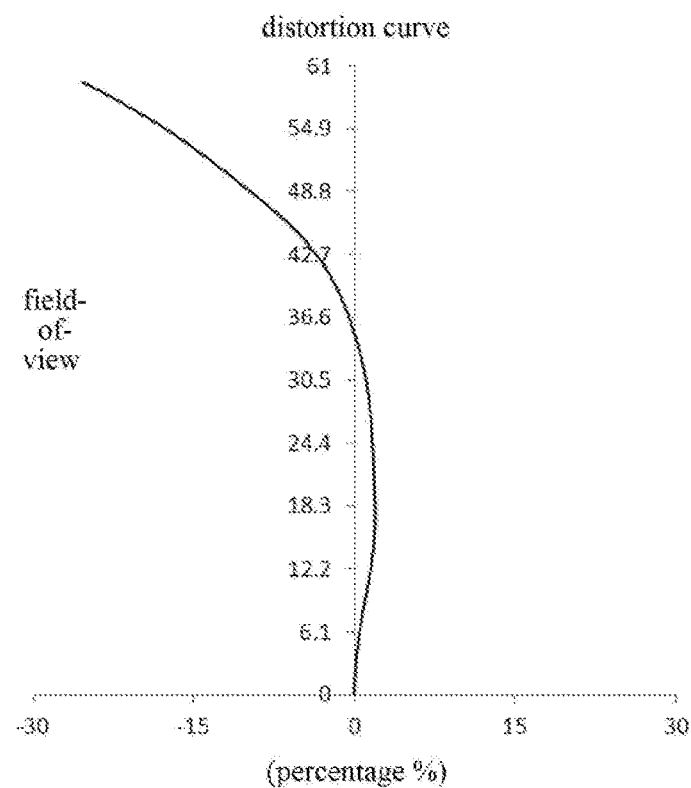
Figure 14D:
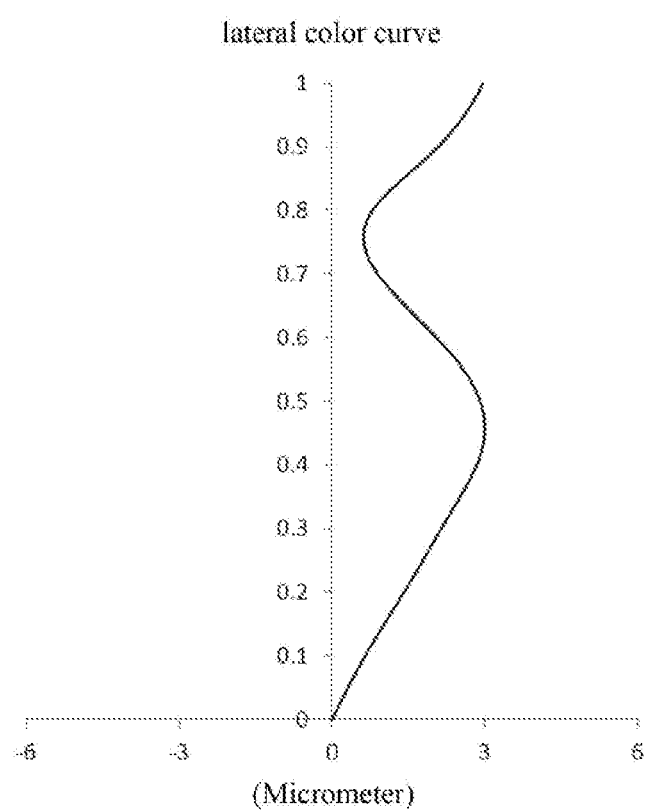

FIG. 14A illustrates the longitudinal aberration curve of the optical imaging lens assembly according to Embodiment 7, representing deviations of images formed by lights of different wavelengths. FIG. 14B illustrates the astigmatic curve of the optical imaging lens assembly according to Embodiment 7, representing a curvature of the tangential image plane and a curvature of the sagittal image plane. FIG. 14C illustrates the distortion curve of the optical imaging lens assembly according to Embodiment 7, representing amounts of distortion at different viewing angles. FIG. 14D illustrates the lateral color curve of the optical imaging lens assembly according to Embodiment 7, representing deviations of different image heights on the image plane after light passing through the optical imaging lens assembly. In summary, with reference to FIGS. 14A to 14D, the optical imaging lens assembly according to Embodiment 7 can achieve good imaging quality.

To sum up, Embodiments 1-7 described above each satisfies the relationships shown in Table 15 below.

TABLE 15

| Embodiments Conditional Expression | 1 | 2 | 3 | 4 | 5 | 6 | 7 |
|---|---|---|---|---|---|---|---|
| FOV (°) | 100.7 | 108.0 | 99.3 | 114.0 | 100.1 | 99.9 | 120.0 |
| TTL/ImgH | 1.21 | 1.15 | 1.25 | 1.22 | 1.21 | 1.21 | 1.21 |
| f5/f3 | 1.06 | 0.94 | 1.32 | 1.22 | 0.79 | 0.34 | 1.23 |
| f7/f4 | 0.88 | 1.15 | 0.95 | 1.17 | 1.22 | 0.14 | 1.01 |
| (R3 + R4)/f2 | 0.52 | 0.53 | 0.22 | 0.16 | 0.71 | 0.96 | 0.19 |
| R7/R8 | 0.60 | 0.54 | 0.56 | 0.56 | 0.57 | 0.69 | 0.56 |
| (T34 + T67)/TTL*5 | 1.31 | 1.08 | 1.25 | 1.17 | 1.30 | 0.90 | 1.17 |
| CT3/(CT1 + CT2 + CT4) | 0.74 | 1.02 | 0.87 | 1.04 | 0.76 | 0.46 | 0.95 |
| DT11/DT21 | 1.34 | 1.52 | 1.21 | 1.20 | 1.27 | 1.40 | 1.69 |
| DT32/DT22 | 1.14 | 1.38 | 1.19 | 1.22 | 1.24 | 1.14 | 1.38 |
| f/(R1 + R2) | −0.48 | −0.46 | −0.06 | −0.33 | −0.38 | −0.19 | −0.39 |
| ImgH (mm) | 6.50 | 6.63 | 6.30 | 6.30 | 6.49 | 6.54 | 6.30 |
| f*tan(FOV/4) (mm) | 2.58 | 2.53 | 2.49 | 2.67 | 2.33 | 2.63 | 2.85 |

The present disclosure further provides an imaging apparatus, having a photosensitive element which may be a photosensitive charge-coupled device (CCD) or complementary metal-oxide semiconductor (CMOS). The imaging apparatus may be an independent imaging device such as a digital camera, or may be an imaging module integrated in a mobile electronic device such as a mobile phone. The imaging apparatus is equipped with the optical imaging lens assembly described above.

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, for example, technical solutions formed by replacing the features as disclosed in the present disclosure with (but not limited to) technical features with similar functions.

What is claimed is:

1. An optical imaging lens assembly comprising, along an optical axis from an object side to an image side sequentially:
   a first lens having a refractive power, wherein an object-side surface thereof is concave in a paraxial region thereof and an image-side surface thereof is convex in a paraxial region thereof;
   a second lens having a refractive power;
   a third lens having a positive refractive power;
   a fourth lens having a negative refractive power;
   a fifth lens having a positive refractive power;
   a sixth lens having a refractive power, wherein an object-side surface thereof is convex—in a paraxial region thereof, and an image-side surface thereof is concave in a paraxial region thereof; and
   a seventh lens having a negative refractive power,
   wherein half of a diagonal length ImgH of an effective pixel area on an image plane of the optical imaging lens assembly satisfies: 6.0 mm<ImgH<7.0 mm.

2. The optical imaging lens assembly according to claim 1, wherein an effective focal length f5 of the fifth lens and an effective focal length f3 of the third lens satisfy: 0.3<f5/f3<1.4.

3. The optical imaging lens assembly according to claim 2, wherein the effective focal length f5 of the fifth lens and the effective focal length f3 of the third lens further satisfy: 0.34≤f5/f3≤1.32.

4. The optical imaging lens assembly according to claim 1, wherein an effective focal length f7 of the seventh lens and an effective focal length f4 of the fourth lens satisfy: 0.1<f7/f4<1.3.

5. The optical imaging lens assembly according to claim 4, wherein the effective focal length f7 of the seventh lens and the effective focal length f4 of the fourth lens further satisfy: 0.14≤f7/f4≤1.22.

6. The optical imaging lens assembly according to claim 1, wherein a radius of curvature R3 of an object-side surface of the second lens, a radius of curvature R4 of an image-side surface of the second lens, and an effective focal length f2 of the second lens satisfy: 0.1<(R3+R4)/f2<1.0.

7. The optical imaging lens assembly according to claim 6, wherein the radius of curvature R3 of the object-side surface of the second lens, the radius of curvature R4 of the image-side surface of the second lens, and the effective focal length f2 of the second lens further satisfy: 0.16≤(R3+R4)/f2≤0.96.

8. The optical imaging lens assembly according to claim 1, wherein a radius of curvature R7 of an object-side surface of the fourth lens and a radius of curvature R8 of an image-side surface of the fourth lens satisfy: 0.3<R7/R8<0.8.

9. The optical imaging lens assembly according to claim 8, wherein the radius of curvature R7 of the object-side surface of the fourth lens and the radius of curvature R8 of the image-side surface of the fourth lens further satisfy: 0.54≤R7/R8≤0.69.

10. The optical imaging lens assembly according to claim 1, wherein an air spacing T34 on the optical axis between the third lens and the fourth lens, an air spacing T67 on the optical axis between the sixth lens and the seventh lens, and a distance TTL on the optical axis between the object-side surface of the first lens and the image plane of the optical imaging lens assembly satisfy: 0.8<(T34+T67)/TTL*5<1.4.

11. The optical imaging lens assembly according to claim 10, wherein the air spacing T34 on the optical axis between the third lens and the fourth lens, the air spacing T67 on the optical axis between the sixth lens and the seventh lens, and the distance TTL on the optical axis between the object-side surface of the first lens and the image plane of the optical imaging lens assembly satisfy: 0.90≤(T34+T67)/TTL*5≤1.31.

12. The optical imaging lens assembly according to claim 1, wherein a center thickness CT3 of the third lens on the optical axis, a center thickness CT1 of the first lens on the optical axis, a center thickness CT2 of the second lens on the optical axis, and a center thickness CT4 of the fourth lens on the optical axis satisfy: 0.4<CT3/(CT1+CT2+CT4)<1.1.

13. The optical imaging lens assembly according to claim 12, wherein the center thickness CT3 of the third lens on the optical axis, the center thickness CT1 of the first lens on the optical axis, the center thickness CT2 of the second lens on the optical axis, and the center thickness CT4 of the fourth lens on the optical axis further satisfy: 0.46≤CT3/(CT1+CT2+CT4) ≤1.04.

14. The optical imaging lens assembly according to claim 1, wherein an effective radius DT11 of the object-side surface of the first lens and an effective radius DT21 of an object-side surface of the second lens satisfy: 1.1<DT11/DT21<1.7.

15. The optical imaging lens assembly according to claim 1, wherein an effective radius DT32 of an image-side surface of the third lens and an effective radius DT22 of an image-side surface of the second lens satisfy: 1.0<DT32/DT22<1.4.

16. The optical imaging lens assembly according to claim 1, wherein a total effective focal length f of the optical imaging lens assembly, a radius of curvature R1 of the object-side surface of the first lens, and a radius of curvature R2 of the image-side surface of the first lens satisfy: −0.5<f/(R1+R2)<0.

17. The optical imaging lens assembly according to claim 1, wherein a total effective focal length f of the optical imaging lens assembly and a maximal field-of-view FOV of the optical imaging lens assembly satisfy: 2.3 mm<f*tan(FOV/4)<2.9 mm.

18. The optical imaging lens assembly according to claim 1, wherein a maximal field-of-view FOV of the optical imaging lens assembly satisfies: 95°<FOV<125°.

19. The optical imaging lens assembly according to claim 1, wherein a distance TTL on the optical axis between the object-side surface of the first lens and the image plane of the optical imaging lens assembly and the half of a diagonal length ImgH of the effective pixel area on the image plane of the optical imaging lens assembly satisfy: TTL/ImgH<1.3.

* * * * *